US010192231B2

(12) United States Patent
Oppenheim et al.

(10) Patent No.: US 10,192,231 B2
(45) Date of Patent: Jan. 29, 2019

(54) MOBILE PAYMENT SYSTEM WITH REWARDS POINTS

(71) Applicant: UNITED AIRLINES, INC., Chicago, IL (US)

(72) Inventors: David Oppenheim, Winnetka, IL (US); Praveen Sharma, Palatine, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 0 days.

(21) Appl. No.: 13/932,770

(22) Filed: Jul. 1, 2013

(65) Prior Publication Data
US 2015/0006271 A1  Jan. 1, 2015

(51) Int. Cl.
G06Q 20/38 (2012.01)
G06Q 20/32 (2012.01)
G06Q 30/06 (2012.01)
G06Q 30/02 (2012.01)
G06Q 20/22 (2012.01)

(52) U.S. Cl.
CPC ......... *G06Q 30/0222* (2013.01); *G06Q 20/32* (2013.01); *G06Q 20/387* (2013.01); *G06Q 30/06* (2013.01)

(58) Field of Classification Search
CPC .................................................. G06Q 30/0238
USPC ....................................................... 705/14.38
See application file for complete search history.

(56) References Cited

U.S. PATENT DOCUMENTS

| 6,128,599 | A  | 10/2000 | Walker et al. |
| 6,327,573 | B1 | 12/2001 | Walker et al. |
| 6,736,322 | B2 | 5/2004  | Gobburu et al. |
| 6,829,586 | B2 | 12/2004 | Postrel |
| 7,469,826 | B2 | 12/2008 | Ciancio et al. |
| 7,618,318 | B2 | 11/2009 | Ciancio et al. |
| 8,123,125 | B2 | 2/2012  | Ciancio et al. |
| 8,127,999 | B2 | 3/2012  | Diamond |
| 8,199,742 | B1 | 6/2012  | Croak et al. |
| 8,200,544 | B1 | 6/2012  | Jones et al. |
| 8,332,290 | B1 | 12/2012 | Venturo et al. |
| 2009/0055296 | A1 | 2/2009 | Nelsen |
| 2009/0089581 | A1 | 4/2009 | Bishop et al. |
| 2009/0179074 | A1 | 7/2009 | Hurst |

(Continued)

FOREIGN PATENT DOCUMENTS

JP   2002007918 A   1/2002
JP   2009245065 A   10/2009

OTHER PUBLICATIONS

International search report and written opinion from PCT/US2014/044562 dated Oct. 16, 2014.

(Continued)

*Primary Examiner* — John Van Bramer
*Assistant Examiner* — Brendon Beheshti
(74) *Attorney, Agent, or Firm* — Marshall, Gerstein & Borun LLP

(57) ABSTRACT

A mobile device transaction system provides a mechanism by which a user of a mobile device may complete a transaction (for goods or services) with a merchant, using an electronic gift card, or other payment type, generated by through the transaction system and chosen to bypass payment using an authorized credit card, where the user is incentivized to use the mobile device transaction system by the award of rewards points to a user account at the time of the transaction.

26 Claims, 18 Drawing Sheets

(56) References Cited

U.S. PATENT DOCUMENTS

| | | | |
|---|---|---|---|
| 2010/0076833 A1 | 3/2010 | Nelsen | |
| 2010/0174596 A1 | 7/2010 | Gilman et al. | |
| 2010/0257040 A1* | 10/2010 | Hunt | 705/14.17 |
| 2010/0280921 A1* | 11/2010 | Stone et al. | 705/27 |
| 2010/0312629 A1* | 12/2010 | Wolf | G06O 20/28 |
| | | | 705/14.27 |
| 2010/0325006 A1 | 12/2010 | White | |
| 2011/0057025 A1 | 3/2011 | Denzer et al. | |
| 2012/0016731 A1 | 1/2012 | Smith et al. | |
| 2012/0095820 A1 | 4/2012 | Chandrasekaram et al. | |
| 2012/0271712 A1* | 10/2012 | Katzin et al. | 705/14.51 |
| 2012/0323765 A1 | 12/2012 | Spaulding et al. | |
| 2013/0110610 A1* | 5/2013 | Boyd | 705/14.27 |
| 2013/0151325 A1 | 6/2013 | Poidomani et al. | |
| 2013/0268413 A1* | 10/2013 | Burr et al. | 705/27.1 |
| 2013/0304559 A1* | 11/2013 | Stone | G06Q 20/06 |
| | | | 705/14.33 |

OTHER PUBLICATIONS

Supplementary European Search Report, European patent application No. EP 14819549, dated Jan. 30, 2017.
Office Action, corresponding in Japanese Patent Application No. 2016-524237, dated Jun. 5, 2018.

* cited by examiner

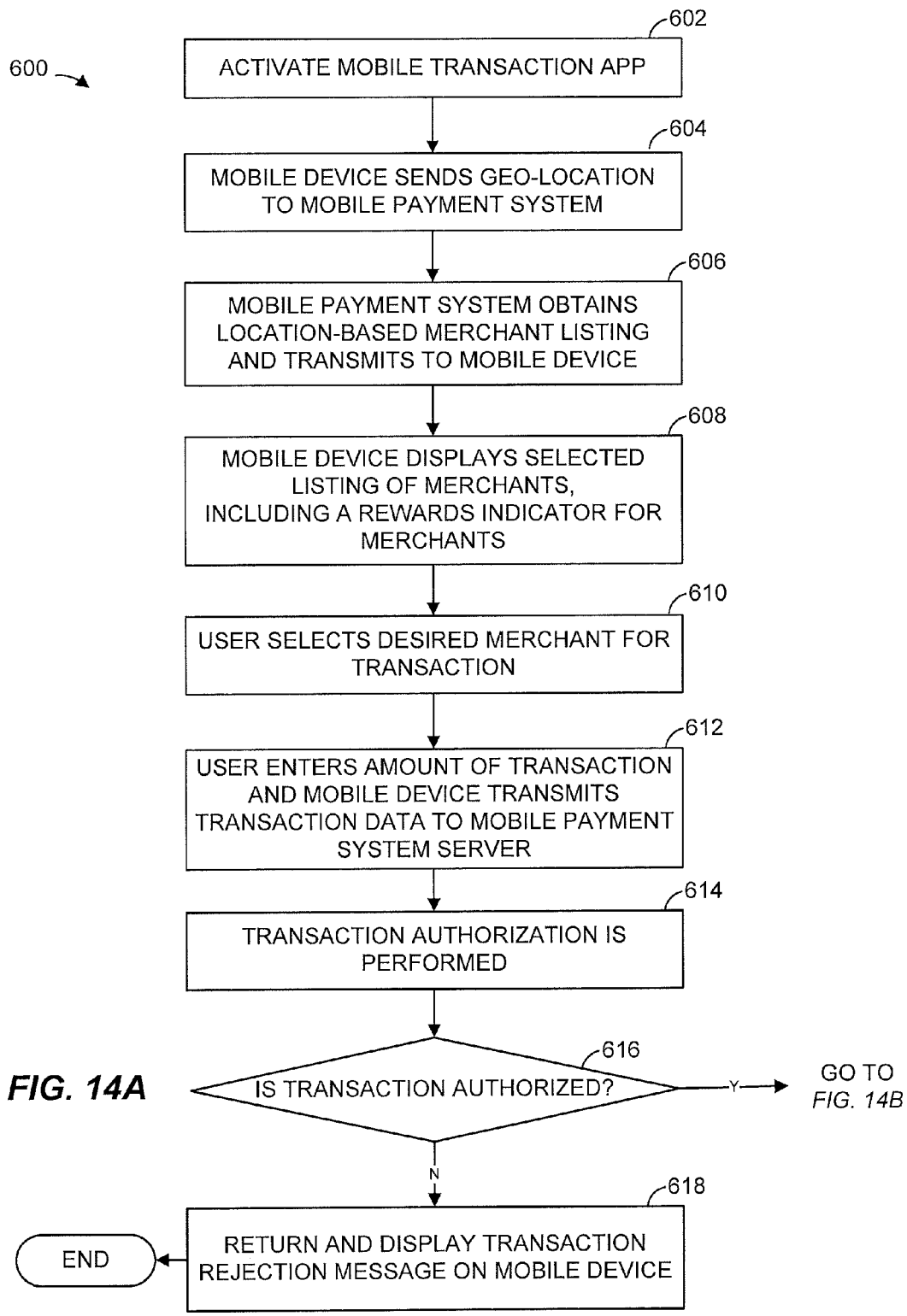

MOBILE PAYMENT SYSTEM WITH REWARDS POINTS

BACKGROUND OF THE DISCLOSURE

Field of the Disclosure

The present disclosure relates to completing transactions using a mobile device and, more particularly, a mobile device interfacing with mobile payment system, where the transaction is accompanied by rewards points.

Brief Description of Related Technology

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

As smartphones have become more popular, companies have begun developing systems that allow users to make point-of-sale purchases via their smartphones. Some have developed systems that include a credit card reader attached to a smartphone. A transaction is completed when a user's credit card is swiped through the reader and the transaction is authorized, at which point the transaction amount is charged to the user's credit card and the purchase amount deposited in a merchant's account. Others have developed virtual wallet applications, in which the user pre-stores a certain amount of money in a virtual account, or associates a credit card with that virtual account. The user authorizes the transfer of money for a transaction to the account of another person or merchant, at which point a virtual cash amount is transferred from the account of the purchaser to the account of the purchasee. Others have proposed mobile applications that are downloaded to a smartphone and associated with a credit card. To make a transaction, a QR code is presented to the customer at the point of sale, for the transaction amount; and the customer scans the QR code with their smartphone, at which point their credit card is charged and the funds are transferred from the credit card processor to the merchant. Each of these systems relies upon using a credit card-based infrastructure to complete a transaction. And they are increasing in popularity. Unfortunately, such systems are expensive for merchants, due to high credit card processing fees.

Others have proposed systems that, instead of using a credit card to complete a transaction, funds may be transferred directly from a customer's bank account to a merchant's account. These systems have failed to gain wide spread use, however. Yet others have developed universal mobile loyalty rewards programs, where a user accumulates rewards points by visiting participating merchants and scanning their smartphones at a kiosk each visit. As points are accumulated, merchants offer incentives to attract customers to use accumulated points at their stores. The program, however, does not involve purchases or transactions of goods and services, only rewards.

SUMMARY OF THE DISCLOSURE

Accordingly, it may be advantageous to provide a technique for allowing a user to complete the purchase goods or services from a merchant via an alternative form of electronic payment, while still benefiting from a credit card process customers are familiar with. That alternative form of electronic payment may be an electronic gift card payment that is accompanied by the award of rewards points to a user account. The transaction system allows a user to identify, using a mobile device, a transaction amount for the purchase and transmit that transaction amount to a mobile payment system. The mobile payment system may then resolve payment of the transaction amount by initially obtaining a payout amount from the user's credit card and then requesting issuance of a variable denomination electronic gift card at the transaction amount. Instead of paying the merchant from a credit card system, the mobile payment system is able to bypass the credit card system and pay the merchant with the electronic gift card created specifically for the transaction and at the requested transaction amount.

The transaction system is able to award rewards points to the user based on the selected merchant, based on the user (e.g., the user's account, transaction history, etc.), or other factors. The rewards points incentivize the user to choose a participating merchant and use the transaction system for payment of a transaction to complement traditional credit card purchases.

In accordance with another example, a method of performing a transaction between a merchant and a consumer using a mobile device, the method includes: receiving, at a mobile payment transaction system, transaction information pertaining to the transaction, the transaction information including a transaction amount and transmitted by the mobile device over a mobile device communication network, the mobile payment transaction system having at least one processor; generating, at the mobile payment transaction system, an electronic gift card having a gift card amount determined from the transaction amount using a gift card valuation rule, the gift card amount being acceptable to the merchant for completing the transaction; generating, at the mobile payment transaction system, an amount of rewards points for the transaction from the transaction amount or the gift card amount using a rewards points valuation rule; and in response to receiving, from the mobile device, confirmation of the consumer accepting the transaction, (i) communicating, from the mobile payment transaction system for receipt at the mobile device, the electronic gift card for completion of the transaction and (ii) communicating, from the mobile payment transaction system for receipt at a rewards account associated with the consumer, the amount of awarded rewards points.

In accordance with another example, a non-transitory computer-readable storage medium having stored thereon a set of instructions, executable by a processor, for performing a transaction between a merchant and a consumer using a mobile device, the instructions include: instructions for receiving, at a mobile payment transaction system, transaction information pertaining to the transaction, the transaction information including a transaction amount and transmitted by the mobile device over a mobile device communication network, the mobile payment transaction system having at least one processor; instructions for generating, at the mobile payment transaction system, an electronic gift card having a gift card amount determined from the transaction amount using a gift card valuation rule, the gift card amount being acceptable to the merchant for completing the transaction; instructions for generating, at the mobile payment transaction system, an amount of rewards points for the transaction from the transaction amount or the gift card amount using a rewards points valuation rule; and instructions for, in response to receiving, from the mobile device, confirmation of the consumer accepting the transaction, (i)

communicating, from the mobile payment transaction system for receipt at the mobile device, the electronic gift card for completion of the transaction and (ii) communicating, from the mobile payment transaction system for receipt at a rewards account associated with the consumer, the amount of awarded rewards points.

In accordance with another example, a system for performing a transaction between a merchant and a consumer using a mobile device, the system includes: a mobile payment transaction system comprising a processor and a memory; wherein the mobile payment transaction system is configured, to receive transaction information pertaining to the transaction, the transaction information including a transaction amount and transmitted by the mobile device over a mobile device communication network; to generate an electronic gift card having a gift card amount determined from the transaction amount using a gift card valuation rule, the gift card amount being acceptable to the merchant for completing the transaction; to generate an amount of rewards points for the transaction from the transaction amount or the gift card amount using a rewards points valuation rule; and in response to receiving, from the mobile device, confirmation of the consumer accepting the transaction, (i) to communicate, from the mobile payment transaction system for receipt at the mobile device, the electronic gift card for completion of the transaction and (ii) to communicate, from the mobile payment transaction system for receipt at a rewards account associated with the consumer, the amount of awarded rewards points.

In accordance with another example, a system for performing a transaction between a merchant and a consumer using a mobile device, the system includes: a mobile payment system comprising a processor and a memory; wherein the mobile payment system is configured, to receive transaction information pertaining to the transaction, the transaction information including a transaction amount and transmitted by the mobile device over a mobile device communication network, the mobile payment transaction system having at least one processor; to receive, from a gift card processing system, an electronic gift card having a gift card amount determined from the transaction amount using a gift card valuation rule, the gift card amount being acceptable to the merchant for completing the transaction; to receive, from a rewards points processing system, an amount of rewards points for the transaction from the transaction amount or the gift card amount using a rewards points valuation rule; and in response to receiving, from the mobile device, confirmation of the consumer accepting the transaction, (i) to communicate, from the mobile payment system for receipt at the mobile device, the electronic gift card for completion of the transaction and (ii) to communicate, from the mobile payment system for receipt at a rewards account associated with the consumer, the amount of awarded rewards points.

In accordance with another example, a system for performing a transaction between a merchant and a consumer using a mobile device, the system includes: a mobile payment system comprising a processor and a memory; wherein the mobile payment system is configured, to receive transaction information pertaining to the transaction, the transaction information including a transaction amount and transmitted by the mobile device over a mobile device communication network, the mobile payment transaction system having at least one processor; to receive, from a gift card processing system, an electronic gift card having a gift card amount determined from the transaction amount using a gift card valuation rule, the gift card amount being acceptable to the merchant for completing the transaction; to generate an amount of rewards points for the transaction from the transaction amount or the gift card amount using a rewards points valuation rule; and in response to receiving, from the mobile device, confirmation of the consumer accepting the transaction, (i) to communicate, from the mobile payment system for receipt at the mobile device, the electronic gift card for completion of the transaction and (ii) to communicate, from the mobile payment system for receipt at a rewards account associated with the consumer, the amount of awarded rewards points.

In accordance with another example, a method of using a rewards points mobile payment system to manage completion of a transaction between a merchant and a consumer using a mobile device, the method includes: receiving, over a mobile device communication network, transaction information pertaining to the transaction from the mobile device to the rewards points mobile payment system, the rewards points transaction system having a processor, the transaction information including a transaction amount and a first form of electronic payment of the transaction; resolving, between the rewards points mobile payment system and a first payment transaction system corresponding to the first form of electronic payment, acceptance of the transaction at a first transaction amount; requesting, between the rewards points mobile payment system and a second payment transaction system, acceptance of the transaction at a second transaction amount less than the first transaction amount, wherein the second payment transaction system is to use a second form of electronic payment that is different from the first form of electronic payment for completing the transaction; generating, at the rewards points mobile payment system, an amount of rewards points for the transaction; distributing the second form of electronic payment at the second transaction amount to the mobile device for completing the transaction between the merchant and the consumer; and separately distributing, from the rewards points mobile payment system to a rewards account associated with the consumer stored at a rewards points system, the amount of rewards points.

In accordance with another example, a non-transitory computer-readable storage medium having stored thereon a set of instructions, executable by a processor, for using a rewards points mobile payment system to manage completion of a transaction between a merchant and a consumer using a mobile device, the instructions include: instructions for receiving, over a mobile device communication network, transaction information pertaining to the transaction, from the mobile device to the rewards points mobile payment system, the rewards points mobile payment system having a processor, the transaction information including a transaction amount and a first form of electronic payment of the transaction; instructions for resolving, between the rewards points mobile payment system and a first payment transaction system corresponding to the first form of electronic payment, acceptance of the transaction at a first transaction amount; instructions for requesting, between the rewards points mobile payment system and a second payment transaction system, acceptance of the transaction at a second transaction amount less than the first transaction amount, wherein the second payment transaction system is to use a second form of electronic payment that is different from the first form of electronic payment for completing the transaction; instructions for generating, at the rewards points mobile payment system, an amount of rewards points for the transaction; instructions for distributing the second form of electronic payment at the second transaction amount to the mobile device for completing the transaction between the merchant and the consumer; and instructions for separately distributing, from the rewards points mobile payment system to a rewards account associated with the consumer stored at a rewards points system, the amount of rewards points.

In accordance with another example, a system for using a transaction system to manage completion of a transaction between a merchant and a consumer using a mobile device, the transaction system includes: a rewards points mobile payment system having a processor and a memory; wherein the rewards points mobile payment system is configured, to receive, from the mobile device, transaction information pertaining to the transaction, the transaction information including a transaction amount and an indication of a first form of electronic payment of the transaction; to resolve, between the rewards points mobile payment system and a first payment transaction system corresponding to the first form of electronic payment, acceptance of the transaction at a first transaction amount; to request, between the rewards points mobile payment system and a second payment transaction system, acceptance of the transaction at a second transaction amount less than the first transaction amount, wherein the second payment transaction system is to use a second form of electronic payment that is different from the first form of electronic payment for completing the transaction; to generate, at the rewards points mobile payment system, an amount of rewards points for the transaction; to distribute the second form of electronic payment at the second transaction amount to the mobile device for completing the transaction between the merchant and the consumer; and to separately distribute, from the rewards points mobile payment system to a rewards account associated with the consumer stored at a rewards points system, the amount of rewards points.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 14A and 14B depict flow diagrams of an example method for performing a transaction using the transaction system.

DETAILED DESCRIPTION OF PREFERRED EMBODIMENTS

Figure 1:
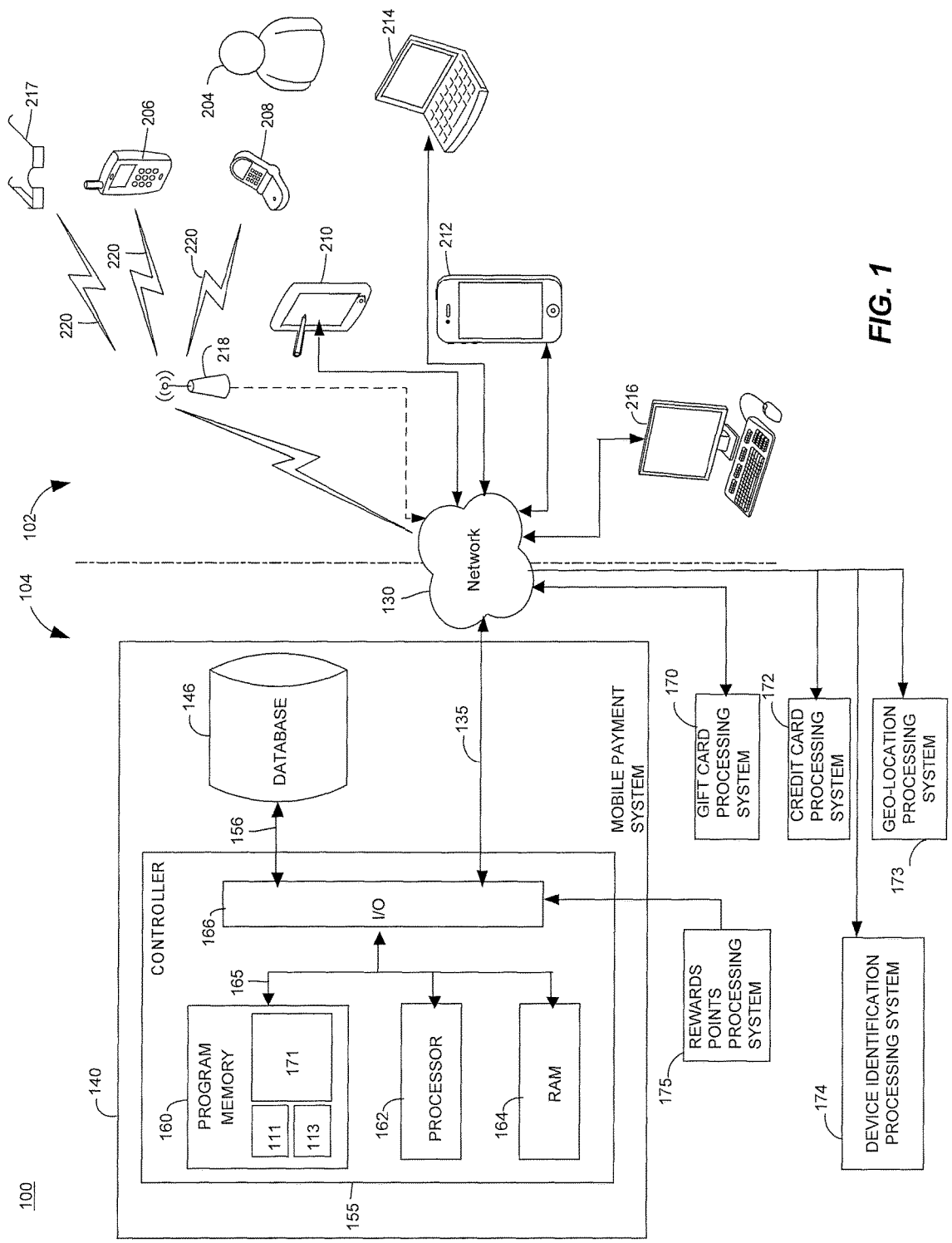
FIG. 1 is a block diagram of an example transaction system for completing a transaction between a mobile device and a merchant, and using an electronic gift card to complete the transaction and rewards points to incentivize the transaction.

FIG. 1 illustrates various aspects of an example architecture implementing a mobile device transaction system 100. The high-level architecture includes both hardware and software applications, as well as various data communications channels for communicating data between the various hardware and software components. The transaction system 100 may be roughly divided into front-end components 102 and back-end components 104. The front-end components 102 are primarily disposed within one or more mobile devices 206-217. The devices 206-217 may be located, by way of example rather than limitation, in separate geographic locations from each other, including different areas of the same city, different cities, or even different states. The back-end components 104 may represent a mobile payment transaction system containing one or more servers or systems communicating with the mobile devices 206-217 through a communication network 130.

For purposes of implementing the mobile device payment system 100, a customer interacts with the transaction system (e.g., a mobile payment system server 140) via a network server, such as a web server communicating via HTTP (hypertext transfer protocol) or any other type of information server capable to transmit information according to any network communications protocol. The network enabled devices may include, by way of example, a network-enabled cellular wireless terminal 206, a phone 208, a tablet computer or personal digital assistant (PDA) 210, a smartphone 212, a laptop computer 214, a desktop computer 216, a wearable wireless communication device such as a wearable computer 217, a tablet computer, an airline kiosk terminal, a portable media player, an e-reader, or other similar devices (not shown), as used by a user 204. Of course, any network-enabled device appropriately configured may interact with the mobile device payment system 100. For convenience, throughout the remainder of this description the system 100 will be described with reference to the device 212 (i.e., the smartphone). However, it should be understood that, unless otherwise stated, any reference to the device 212 should be understood as referring to any one of the network-enabled devices 206-217.

The front-end components 102 communicate with the back-end components 104 via a digital network 130. One or more of the front-end components 102 may be excluded from communication with the back-end components 104 by configuration or by limiting access due to security concerns. For example, it may be advantageous for each network enabled device 206-217 to be associated with a user name (e.g., a frequent flier rewards membership identifier such as the MileagePlus® program offered by United Air Lines), and to require a password before allowing the network enabled device 206-217 to access various programs and routines stored in the back-end components 104. The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. The digital network 130 may communicate with the devices 206-217 through wireless or wired connections. Further, in some examples, the digital network 130 is a mobile (or cellular) communication network.

The devices 206-217 need not necessarily communicate with the network 130 via a wired connection. In some instances, the devices 206-217 may communicate with the network 130 via wireless signals 220; and, in some instances, the devices 206-217 may communicate with the network 130 via an intervening wireless or wired device 218, which may be a wireless router, a wireless repeater, a base transceiver station of a mobile telephony provider, etc., or other access point. Each of the network-enabled devices 206-217 may interact with the network access point 218 to receive information including web pages or other information adapted to be displayed on a screen, such as the screens depicted in FIGS. 4-13, for display on the device 212. It will be appreciated that although only one access point 218 and one server 140 is depicted in FIG. 1, multiple web servers may be provided as well as multiple access points for the purpose of distributing server load, serving different web pages, implementing different portions of the web interface, etc.

The back-end components 104 include a mobile payment system 140, implemented as a server in this example, as well as a gift card processing system 170, a credit card processing system 172, a geo location processing system 173, a device identification processing system 174, and a rewards points processing system 175. Of course, the devices 206-217 may be communicatively connected to different back-end components 104 having one or more functions or capabilities that are similar to the mobile payment server 140 and processing systems 170 and 172. The mobile payment system 140 may include one or more computer processors 162 adapted and configured to execute various software applications and components of the mobile device payment system 100, in addition to other software applications, such as fraud monitoring or program eligibility. The mobile payment server 140 further includes a database 146. The database 146 is adapted to store data related to the operation of the transaction system 100, e.g., user profile user data including name; rewards account number; credit card account numbers; age; address(es); contact information; past purchase histories; behavioral segment; premier status level; analytics; business rules; merchant data; merchant catalog; earn offer content; business rules engine (BRE); etc. The mobile payment server 140 may access data stored in the database 146 when executing various functions and tasks associated with the operation of the payment transaction system 100.

Although the transaction system 100 is shown to include one mobile payment server 140 and the gift card processing system 170, the credit card processing system 172, the geo-location processing system 173, the device identification processing system 174, and the rewards points processing system 175, in communication with the mobile payment system 140, it should be understood that different numbers of mobile payment systems 140, gift card processing systems 170, credit card processing servers 172, geo location processing systems 173, device identification processing systems 174, rewards points processing systems 175, and devices 206-217 may be utilized. For example, the digital network 130 (or other digital networks, not shown) may interconnect, in the system 100, numerous mobile payment systems 140, numerous transaction processing systems 170, 172, and 175, and many thousands of devices 206-217. According to the disclosed example, this configuration may provide several advantages, such as, for example, enabling near real-time uploads and downloads of information as well as periodic uploads and downloads of information. This configuration provides for a primary backup of all the information generated in the transaction system 100. Alternatively, some of the devices 206-217 may store data locally.

While the back-end components 104 are described as including a mobile payment system 140 in communication with the gift card processing system 170, the credit card processing system 172, and the rewards points processing systems 175, each of these systems may represent any type of suitable transaction processing system, as discussed in further examples below.

FIG. 1 also depicts one possible embodiment of the mobile payment system 140. The system 140, as an application server, may have a controller 155 operatively connected to the database 146 via a link 156 connected to an input/output (I/O) circuit 166. It should be noted that, while not shown, additional databases (e.g., containing analytics, business rules, gift card data, merchant location data, merchant catalog data, earned offer content data, and fraud data) may be linked to the controller 155 or configured within the database 145. The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

Various software applications resident in the front-end components 102 and the back-end components 104 implement functions related to completing a mobile transaction (i.e., the purchase of goods or services using a mobile device to initiate and complete the transaction) and provide various user interfaces to allow users (e.g., customers) to access the system 100. One or more of the front-end components 102 and/or the back-end components 104 may include a user-interface application 111 for allowing a user, such as the customer or a customer service representative, to input and view data associated with the system 100, and to interact with the mobile device payment system 100 described below. In one embodiment, the user interface application 111 is a web browser client, and the application server 140 implements a server application 113 for providing data to the user interface application 111. However, the user interface application 111 may be any type of interface, including a proprietary interface, and may communicate with the application server 140 using any type of protocol including, but not limited to, file transfer protocol (FTP), telnet, hypertext-transfer protocol (HTTP), etc. Moreover, some embodiments may include the user interface application 111 running on one of the network-enabled devices 206-217 (as when a customer is accessing the system). The information sent to devices 206-217 from the application server 140 includes data retrieved from the database 146. The mobile payment system 140 may implement any known protocol compatible with the user-interface application 111 running on the devices 206-217 and adapted to the purpose of receiving and providing the necessary customer information during the mobile payment scanning process. The mobile payment system 140 includes a mobile transaction resolving application 171 to carry out functions of the mobile payment system discussed below, e.g., functions related to communicating received customer data from the mobile devices 206-217 to the gift card processing system 170, the credit card processing system 172, the geo location processing system 173, the device identification processing system 174, and the rewards points processing system 175. The mobile transaction resolving application 171 may be stored in one or more of the program memory 160 or RAM 164.

While not shown in detail, each of the systems 170, 172, 173, 174, and 175 may be similar to those of the mobile payment system 140, and implemented on servers. That is, each of the systems 170, 172, 173, 174, and 175 may include a controller including program memory, a microcontroller or a microprocessor, a random-access memory (RAM), and an input/output (I/O) circuit, all of which are interconnected via an address/data bus (not shown).

The gift card processing system 170 may include an application including algorithms configured to authorize and issue electronic gift cards at a variable amount based on transaction data received from the mobile devices 206-217, directly or (as illustrated) through the mobile payment system 140. The system 170 may be configured to transmit issued electronic gift cards to the mobile payment system 140 for communication to the respective mobile device 206-217 to complete a transaction initiated at that mobile device. The gift card processing system 170 may apply a gift card valuation rule when determining the amount for the electronic gift card. For example, the gift card valuation rule may issue the electronic gift card at the exact amount of the transaction. In other examples, the gift card valuation rule may result in issuance of an electronic gift card at another amount different than the amount of the transaction. In some examples, the gift card processing system 170 may be third party gift card system. In some examples, the gift card processing system 170 may be a system of the merchant. The resulting electronic gift cards may be communicated to a mobile device through the mobile payment system 140, directly from the system 170, or through other channels.

The credit card processing system 172 may include an application including algorithms configured to receive transaction data from the mobile devices 206-217, directly or (as illustrated) through the mobile payment system 140. The user of the mobile device 206-217, or the mobile devices themselves, may be associated with one or more credit card providers; and the system 172 may represents a plurality of different credit card processing systems for each of the user's credit cards. As discussed further below, each credit card processing system may work in conjunction with the mobile payment system 140 to review, authorize and complete a credit card side payment for a transaction. The resolution of a credit card transaction payment may occur before the mobile payment system 140 communicates with the gift card processing system 170 to complete the transaction between the user of the mobile device 206-217 and a corresponding point-of-sale merchant, such that the merchant, at least in this described example, is paid by the electronic gift card issued by the gift card processing system 170, instead of by a payment from the credit card processing system 172. In some examples, the credit card chosen by a customer (i.e., user) may be associated with a rewards program, for example where use of the credit card accrues corresponding rewards points for that user, or any associated user, in a separate rewards account. In such examples, the credit card processing system 172 may automatically receive or otherwise determine a customer's credit card information based on information associated with the customer's rewards points account.

While in examples the payment processing system 172 is described as a credit card processing system, the system 172 may be any type of suitable payment system that may be integrated for use with a mobile device, as described herein. The system 172, for example, may be a debit card processing system, a wire service (e.g., Western Union®), an automated clearing house system, an online money transfer service (e.g., PayPal®), etc.

The geo-location processing system 173 may include an application including algorithms configured to receive location data from the mobile devices 206-217 and transmit this data to the mobile payment system 140 (e.g., to the geo-location application 192) and determine the latitude and longitude for the user. The geo-location processing system 173 may, in some examples, produce data for the offer management application 188 to produce appropriate rewards offered by merchants.

The device identification processing system 174 may include an application including algorithms configured to receive mobile device and transaction attributes from the mobile devices 206-217, the geo-location processing system 173, and the mobile payment system 140, to determine a fraud risk score. The device identification processing system 174 may, in some examples, determine different fraud risk scores for the device, merchant, location, and business rules providing that information to the mobile payment system 140 (e.g., to an authenticator module 190) for communicating to the mobile device 206-217.

The rewards points processing system 175 may include an application including algorithms configured to receive transaction data from the mobile payment system 140 and determine an amount of rewards points (e.g., travel miles that may be used for purchase of airfare, hotel, car rentals, and/or others goods and services) to award to the user for accepting the transaction. The rewards points processing system 175 may include, but is not limited to, a rewards bank, a form of payment system, a data warehouse, a member profile data engine, or some combination of these or some multiple versions of these. In some examples, different rewards points systems may be used for different mobile devices and managed through a mobile payment system. It will be appreciated that the reward system may thus be an accrual system used to incentivize transactions between the customer and the merchant. Some example types of incentivizing systems are discussed hereinbelow. In some examples the system 175 may determine an amount of rewards points for a transaction before the user accepts the transaction. In some examples, the system 175 may determine an amount of rewards points after the user accepts or authorizes the transaction. The awarded rewards points may be communicated to a rewards account of a user through the network 130 or through another communication network, such as to a server or processor directly.

Figure 15:
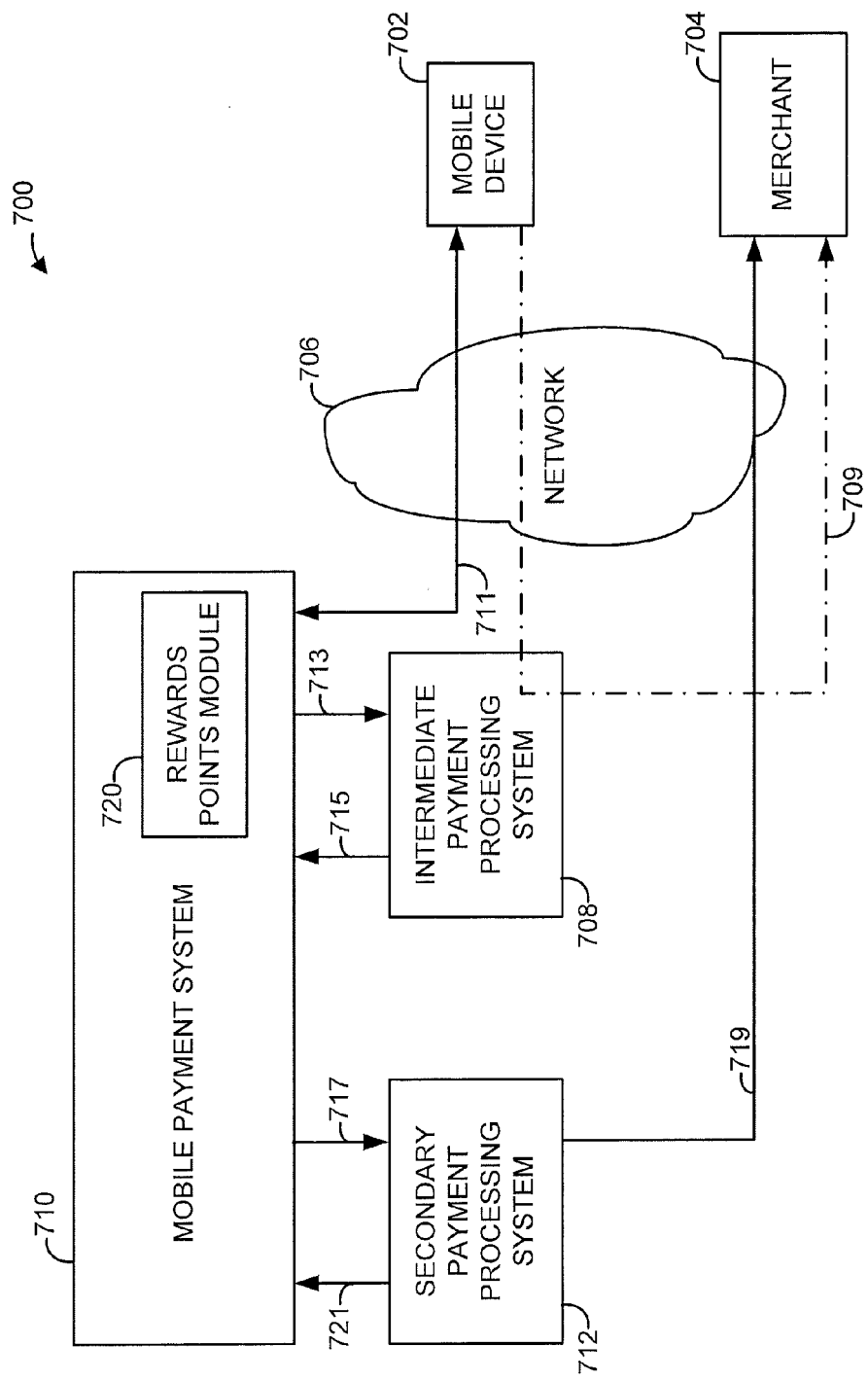
FIG. 15 is a block diagram of another example transaction system for completing a transaction.

Any of the systems 170, 172, 173, 174, or 175 may be implemented separately from the mobile payment system 140 or as integral part of the system 140. For example, the rewards points system 175 may be implemented within the mobile payment system 140, either in the mobile transaction resolving application 171 or elsewhere in the program memory 160, or in a dedicated machine or memory within the system 140 implemented as a server. FIG. 15 illustrates an example configuration of a mobile payment system including a rewards points module.

Figure 2:
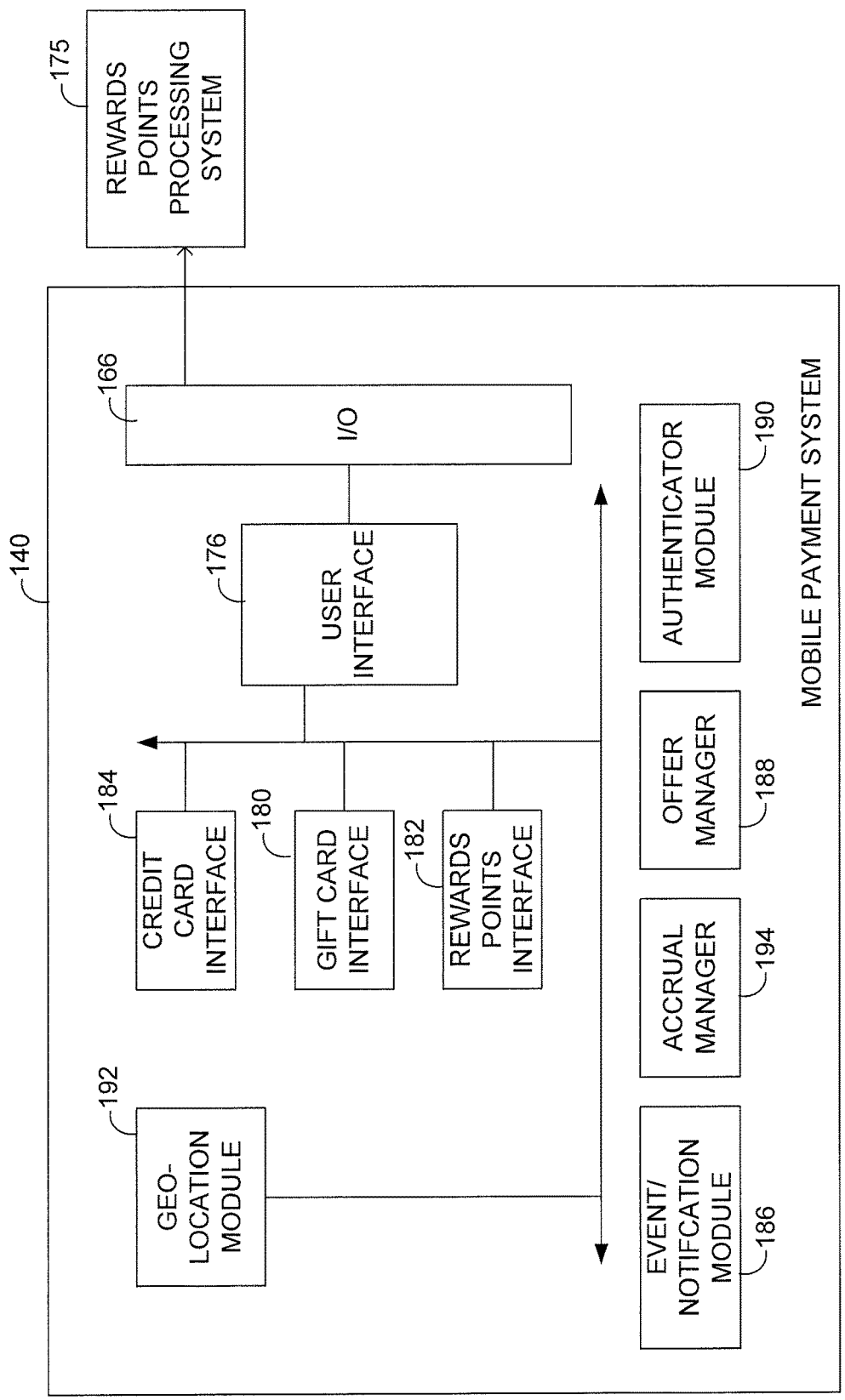
FIG. 2 is a block diagram of a mobile payment system as may be implemented in the system of FIG. 1.

FIG. 2 depicts a block diagram of an example implementation of the mobile payment system 140. The blocks may represent applications or subroutines stored (i.e., as a machine readable instructions) in the program memory 160, including partially or fully as part of the mobile transaction resolving application 171. A user interface module 176 receives and/or transmits data back and forth with the mobile device 206-217, including merchant related data, such as merchant name and identification, whether the merchant is part of a gift card/rewards points system, a determination of the available rewards points for a transaction for any of a series of merchant, a ranking of competing merchants based on the determination of available rewards points from each. The user interface module 176 may also receive and/or transmit back and forth user specific data, such as the user name, and identification, the number of rewards points in a user's rewards points account, the transaction history of the user, the items identified for purchase in a transaction, location identifying information from the mobile device, etc. The user interface module 176 may communicate received data to any of the corresponding applications in the mobile payment system.

The mobile payment system 140 further includes a gift card system interface application 180 to interface with the gift card processing system 170, a rewards points interface application 182 to interface with the rewards point processing system 175, and a credit card interface application 184 to interface with the credit card processing system 172, an authenticator 190 to interface with the device identification processing system 174, and a geo-location application 192 to interface with the geo location processing system 173

Other applications that may be included in the mobile payment system 140 include an event notification application 186 that is able to push notices to the mobile device 212, such as special programs, promotions, announcements, and advertising. An offer management application 188 accesses data on merchants, executes a rewards points valuation rule to determine rewards points offered for a specific merchant, and computes additional promotional rewards points that may be offered. An accrual management application 194 computes the actual rewards points earned based on the transaction amount, specific merchant, and other attributes of the user. An authenticator application 190 examines user data, device attributes, transaction attributes, geo-location, business rules and determines if a user is authorized to complete a transaction with the merchant. In this way, the authenticator application 190 may provide protection against fraud at the mobile payment system 140, while the application 190 may also interface with authenticators and fraud protection operations at any of the payment processing systems 170, 172, and/or 175, or with the device identification system 174.

To determine the location of the mobile device 212, based on the geo-locating data from the device 212, a geo-location application 192 is provided to determine a geographic location of the mobile device 212. In other examples, the geo-location application 192 communicates with the geo-locating processing system 173, such as Foursquare, Google, etc. Once the location of the device 216 is determined, the offer manager application 188 interfaces between the user interface 176 and the processing system interfaces 180, 182, and 184 to manage transactions between the respective payment processing systems. The offer manager application 188 may determine a desired listing of merchants to provide for display on mobile device 212, where the display of available merchants will indicate the difference in rewards points allotments for the different merchants. In some examples, the offer management application 188 may organize a listing of merchants, listed by number of rewards points available for transaction, and send that list to the device 212 for display and selection by the user.

Figure 3:
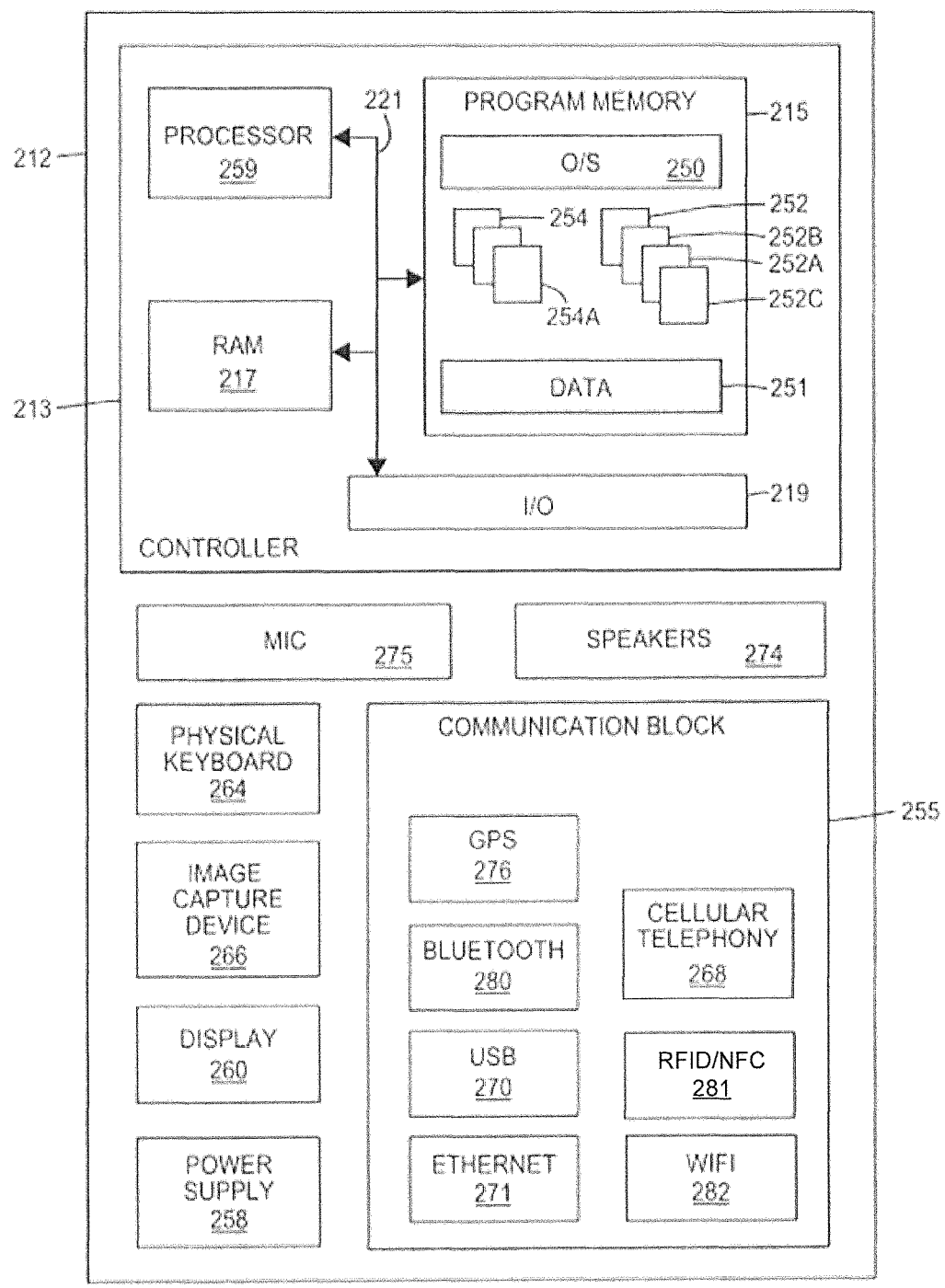
FIG. 3 is a block diagram of an example mobile device as may be used in the system of FIG. 1.

FIG. 3 depicts a block diagram of an example one of the user devices 206-217, for example the smartphone 212. The device 212 may operate in a variety of hardware and/or software configurations. The device 212 includes a controller 213. Similar to the controllers described above, the controller 213 includes a program memory 215, a microcontroller or a microprocessor 259, a random-access memory (RAM) 217, and an input/output (I/O) circuit 219, all of which are interconnected via an address/data bus 221. In some embodiments, the controller 213 may also include, or otherwise be communicatively connected to, a database (not shown) or other data storage mechanism (e.g., one or more hard disk drives, optical storage drives, solid state storage devices, SIM cards, etc.). It should be appreciated that although FIG. 3 depicts only one microprocessor 259, the controller 213 may include multiple microprocessors 259. Similarly, the memory of the controller 213 may include multiple RAMs 217 and multiple program memories 215. Although FIG. 3 depicts the I/O circuit 219 as a single block, the I/O circuit 219 may include a number of different types of I/O circuits. The controller 213 may implement the RAM(s) 217 and the program memories 215 as semiconductor memories, magnetically readable memories, and/or optically readable memories, for example.

The program memory 215 and/or the RAM 217 may store various applications (i.e., machine readable instructions in a non-transitory form) for execution by the microprocessor 259. For example, an operating system 250 may generally control the operation of the device 212 and provide a user interface to the device 212. Various applications 254 may allow the user 204 to perform various functions associated with the device 212. By way of example, and without limitation, the applications 254 may include, among other things: an application for accessing telephony services; an application for sending and/or receiving email; an application for sending and/or receiving text or short message service (SMS) messages; a calendar application; a contact list application; a web browsing application; etc. In particular, the applications 254 may include an application 254A for capturing electronic document data associated with mobile device payment system 100.

The program memory 215 and/or the RAM 217 may also store a variety of subroutines 252 for accessing specific functions of the device 212. By way of example, and without limitation, the subroutines 252 may include, among other things: a subroutine 252A for accessing geolocation services, a subroutine 252B for accessing image capture services, and other subroutines, for example, implementing software keyboard functionality, interfacing with other hardware in the device 212, etc.

The program memory 215 and/or the RAM 217 may further store data 251 related to the configuration and/or operation of the device 212, and/or related to the operation of one or more of the applications 254 or subroutines 252. For example, the data 251 may be image data captured by an image capture device, may be data input by a user, may be data received from a server (e.g., the application server 140), data determined and/or calculated by the processor 259, etc.

In addition to the controller 213, the device 212 may include other hardware resources. For example, the device 212 may include a power supply 258, which may be a battery in the case of a mobile device. The device 212 may also include various types of input/output hardware such as a visual display 260, a keyboard 264, an image capture device 266, one or more speakers 274, a microphone 275, and/or a pointing device (not shown). In an embodiment, the display 260 is touch-sensitive, and may cooperate with a software keyboard routine as one of the software routines 252 to accept user input.

The image capture device 266 may be any type of image capture device. In an embodiment in which the transaction system 100 communicates with the device 212, the device 212 may include a built-in image capture device, e.g., to collect data on items for purchase in a transaction. Alternatively, the image capture device 266 may be, in some instances, external to the device 212, such as coupled to the device 212 via a serial connection (e.g., a universal serial bus, or "USB," connection). In some embodiments, the image capture device 266 includes adjustable focusing optics. In some embodiments, the image capture device 266 may also include optics for allowing the image capture device 266 to zoom.

The device 212 may be configured with a communication block 255 including a variety of hardware for wireless and/or wired communications. Example wireless communication hardware in the communication block 255 may include cellular telephony circuitry 268, GPS receiver circuitry 276, Bluetooth circuitry 280, Radio Frequency Identification (RFID) or Near Field Communication (NFC) circuitry 281, or Wi-Fi circuitry 282 (i.e., circuitry complying with an IEEE 802.11 standard), as well as hardware supporting any number of other wireless communications protocols. Example wired communications hardware in the communication block 255 may include, for example, USB circuitry 270, Ethernet circuitry 271, and/or hardware supporting any number of other wired communications protocols. The RFID/NFC circuitry 281 may be used for numerous different purposes, including, in some examples, to identify items for purchase in a transaction, in place or in addition to other user input means on the device 212.

It should be recognized that different mobile devices may implement different mechanisms for user input. In an example described above, the device 212 may have a touch sensitive display screen 260. Accordingly, "buttons" which are displayed on the screen and are not physical buttons, are "pressed" by touching the screen in the area of the button. However, those of ordinary skill in the art will readily appreciate that such user interface controls may be accomplished in other manners, such as using soft-keys, navigating controls using navigation buttons on a keyboard or using a roller ball, selecting numbers corresponding to different controls, entering information on a keyboard, etc. Additionally, the device 212 may receive voice commands via the microphone 275. Such voice commands may be interpreted by an application 254 (e.g., the Siri® product from Apple Computer).

It should be understood that it may be desirable for some or all of the data transmitted from the system server 140 to the device 212, or vice versa, to be encrypted and/or otherwise transmitted in a secure manner (e.g., using Hypertext Transfer Protocol Secure, known as "HTTPS" or another secure communications protocol).

Typically, a user may launch or instantiate a user interface application (e.g., a web browser, mobile application, or other client application) from a network-enabled device, such as the network-enabled devices 206-217, to establish a connection with the mobile payment system 140 to implement the transaction system 100. In this way, the mobile payment system 140 may be implemented on a server. In other examples, a mobile payment system may be implemented on a separate computer connected to the digital network 130 through a network server.

The terms "customer", "consumer", and "user" are used herein interchangeably and are not limited to a single person, but may instead represent any person or persons having a reason or desire to make a purchase on a point-of-sale of a merchant. Generally, the terms "user", "customer" and "consumer" are used when referring to a person or persons operating the device 212.

Figure 4:
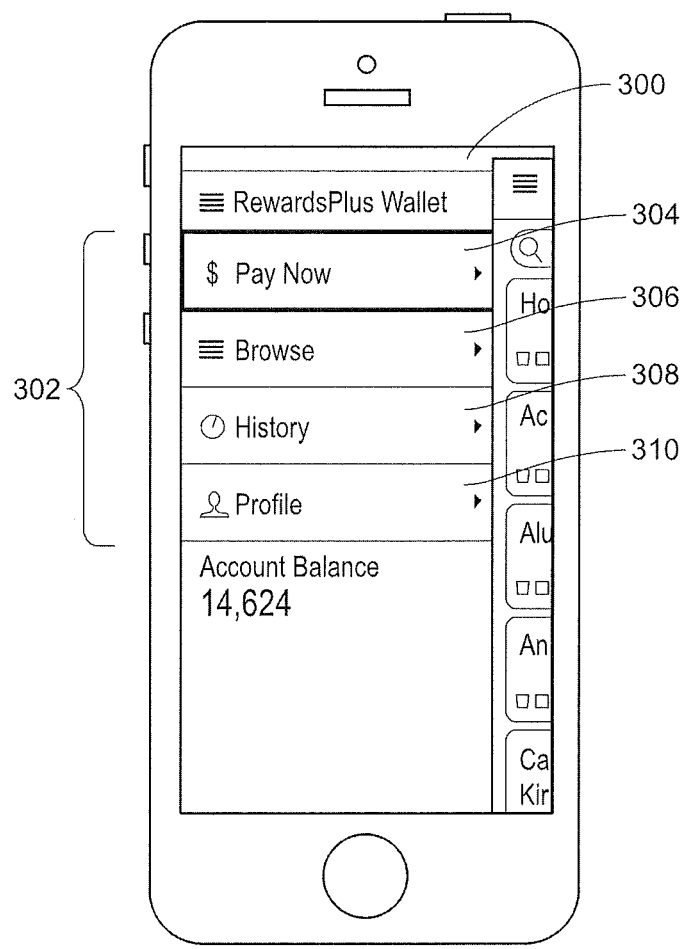
FIGS. 4-13 are example screenshots of displays presented to the user on a mobile device as part of the transaction system.

As described above, to access the transaction system 100, the user 204 executes the client application 254A on the device 212. Using the application 254A, the user 204 may request and navigate a series of web pages or screens (see, e.g., FIGS. 4-13) including information transmitted by mobile payment system 140 to the device 212. In some embodiments, the web page or screen may be transmitted as a whole by the server system 140 to the device 212. In other embodiments, some portion of the web page or screen may reside in the program memory 215 of the device 212, while the server system 140 transmits to the device 212 information to populate various fields of the web page or screen. FIGS. 4-13 depict example web pages or screens that may be displayed by the application 254A in various embodiments of the mobile device payment system 100. Some of the web pages or screens share common elements. FIG. 4 depicts a "Menu" screen 300 (i.e., the web page or screen) that is presented to the user 204 after the user selects a menu button, performs a swiping gesture on the mobile device 212, or performs some other selection. The "Menu" screen 300 contains buttons or links 302 that allow the user to navigate to different screens corresponding to functions of the application 254A, as discussed below. Although, in other examples, other screens may include some of all of these buttons.

Figure 5:
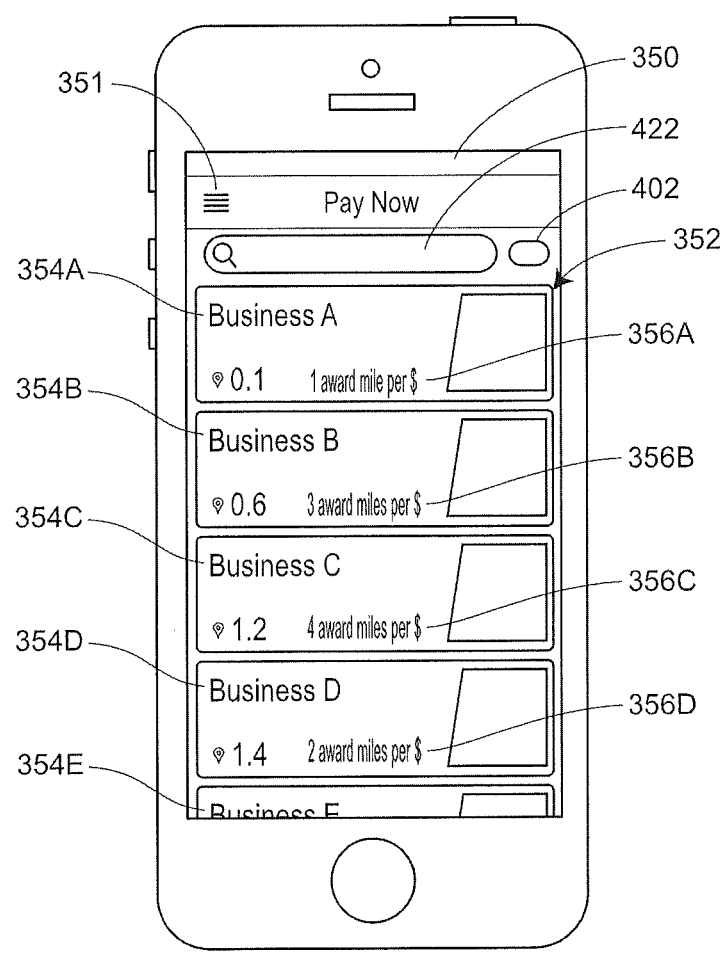

FIG. 5 illustrates "Pay Now" or "Home" screen 350 that may be displayed to the user after the user executes and successfully logs into the client application 254A. The screen 350 therefore may represent the first screen the user sees after an optional login screen has asked and received a login name and password. The screen 350 may also be accessed after selecting a "Pay Now" button or link 304 in the "Menu" screen 300. The screen 350 includes a menu button 351 for returning to the "Menu" screen 300. A main window 352 that lists a series of merchants from a geo-location search for participating merchants. In the illustrated example, the window 352 lists those merchants in order of geographic closeness to the determined location of the mobile device. Five merchants are listed 354A-354E. The merchant name is illustrated, the distance from the current location, and the amount of rewards points per transaction unit (e.g., rewards points per $1) 356A-356D (as shown). Thus, in this example, the rewards points valuation rule may be determined prior to the transaction. As shown the rewards points rules may be different for different merchants, as determined by the offer manager application 188, for example. In some examples, rewards points valuation rules are determined from information pertaining to the merchant, and not from information pertaining to the consumer. In other examples, rewards points valuation rules may be determined from information pertaining to the consumer, and not from information pertaining to the merchant. In other examples, a combination of merchant and customer information may be used. In any event, by way of example, the information pertaining to the merchant may be merchant transaction history, merchant transaction amount, merchant product catalog, seasonal relevance, or some combination thereof. By way of example, the information pertaining to the consumer may be consumer transaction history, transaction amount, participation in other aspects of the rewards program, or some combination thereof. In some examples, the rewards points valuation rule is determined based in part on the gift card valuation rule.

Figure 6:
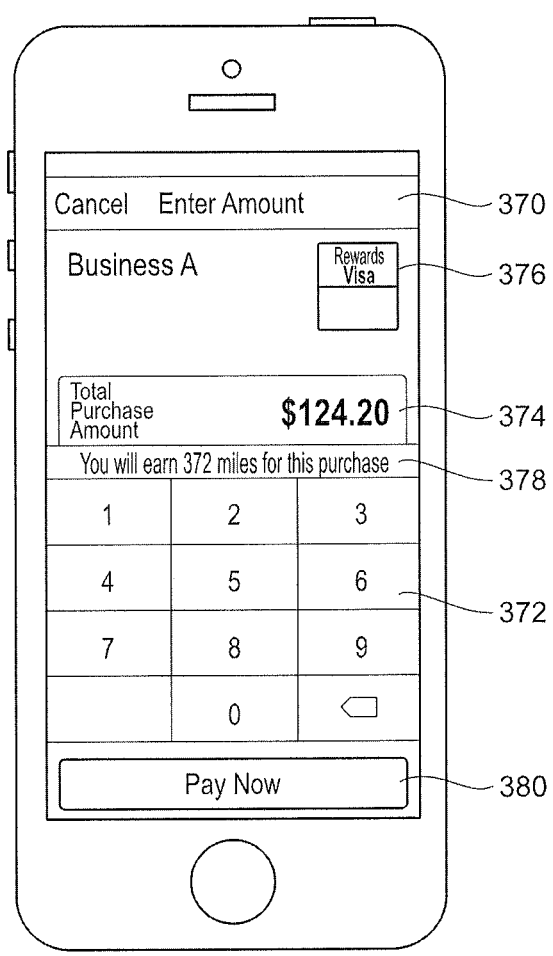

FIG. 6 illustrates an "Enter Amount" screen 370 that may be displayed after the user selects one of the merchant buttons or links 354A-354E. At the screen 370, the user is presented a keypad 372 for entering the merchant's price for the transaction, which is displayed as the purchase amount 374. In the illustrated example, a payment selection badge 376 lists a preselected (e.g., a default) method of payment. In the examples described herein, that payment method is a credit card account corresponding to the user. Tapping on the badge 376 opens an overlay window allowing the user to scroll through any number of stored payment methods (other credit cards, Paypal®, etc.) as the user's form of payment.

While in this example the user manually enters the total purchase price for the transaction, in other examples, the mobile device 212 may be used to scan (or key press in, etc.) one or product identifications codes, (e.g., barcodes, QR codes, etc.) corresponding to the transaction or a single transaction-specific identification code. Such scanning may be achieved using the image capture device 266. In such examples, the total purchase price would reflect a total based on the price of all scanned items. In some examples, the total purchase price may be obtained using an RFID and/or NFC embedded within the items for purchase. Such a system may automatically scan items identified for purchase and collect transaction data, such as the price of the items, the name of the items, corresponding stock number, etc.

The screen 370 further displays the calculated number of reward points 378 corresponding to the entered total purchase amount 374. The value of the rewards points 378 as determined from the rewards points rules. In some examples, that rewards point value 378 is determined by the accrual manager application 194 in response to the purchase amount value being transmitted to the mobile payment system 140, prior to final acceptance by the user. In other examples, the determined rewards points value 378 may be determined at the mobile device 212 or at the mobile payment system 140 using a rewards points rule. That is, in some examples, the mobile payment system 140 will transmit a rewards points rule to the mobile device 212, e.g., the rules 356A-356E, to allow the mobile device 212 to determine the amount of rewards points associated with the transaction. Generally, it may be desired to have the mobile payment system 140 or the rewards points processing system 175 determine the value of the rewards points 378, at the point of transaction, in the event those rewards points do not correlate exactly to the rules 356A-356E, e.g., in the event the system determines that more rewards points should be awarded. In any event, in some examples, the rewards points rules 360A-360E may be determined exclusively based on the merchants, while the rewards points valuation rule used to determine the value of rewards points 378 may be different.

Figure 7:
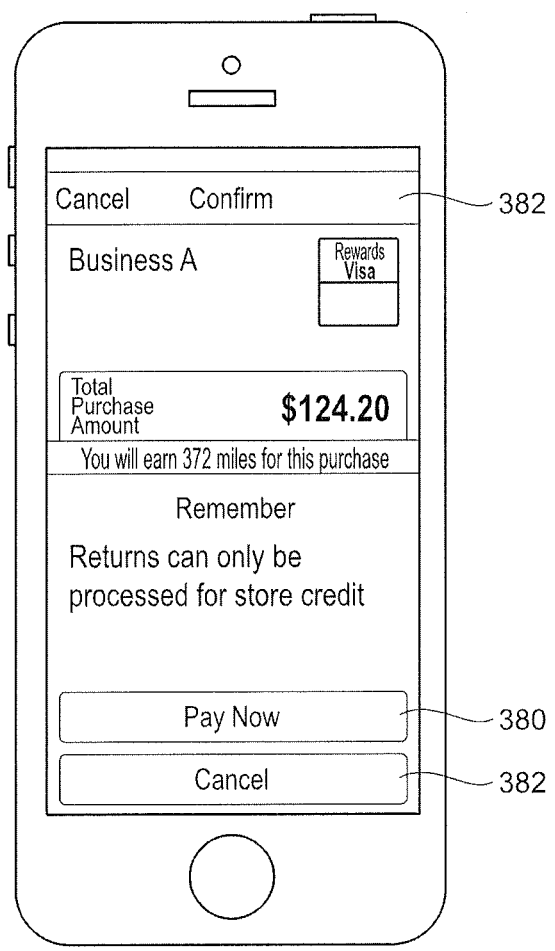

Once the user is ready to accept the transaction for payment, a "Pay Now" button 380 is selected, after which the user is taken to a "Confirm" Screen 382, shown in FIG. 7, and asked to confirm the transaction, by re-selecting the "Pay Now" button 380 or to cancel the transaction by selecting the "Cancel" button 382.

Figure 8:
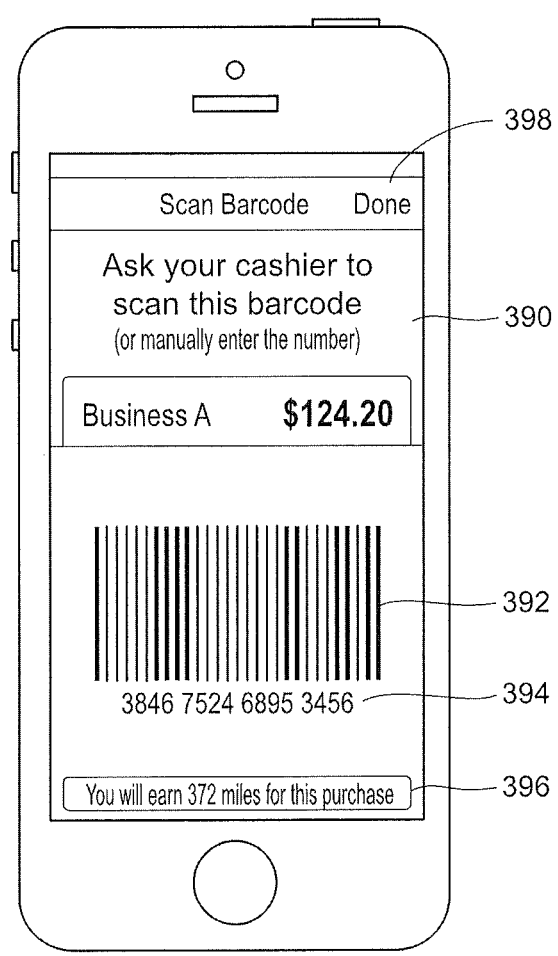

FIG. 8 illustrates a transaction acceptance screen 390. After selecting the "Pay Now" button 380 at screen 382, the mobile device 212, transmits transaction data to the back-end component 104, and in particular to the mobile payment system 140, in the illustrated example, for resolution of payment of the transaction, as discussed further below. Instead of settling the transaction with the merchant through the user's selected form of payment, namely a credit card, the mobile payment system 140 sends back an electronic gift card, in the exact amount of the transaction, to the mobile device 212 for completing the transaction. In the illustrated example, that electronic gift card, issued from the gift card processing system 170 is depicted as a barcode 392, with a specified serial number 394 for the listed purchase amount of the transaction 374. The screen 390 also depicts the number of rewards points 396 awarded to the user's rewards points account by the rewards points processing system 175. In other examples, the electronic gift card may be transmitted as a QR code or other standardized identification code depiction, including proprietary codes such as the Microsoft TAG code. To complete the transfer of funds to the merchant, the screen 390 instructs that the cashier is to scan the barcode 392 or manually enter the barcode serial number. When completed and the barcode has been scanned a "Done" button 398 returns to the "Menu" screen 300, or the "Pay Now" screen 350, when selected.

Figure 9A:
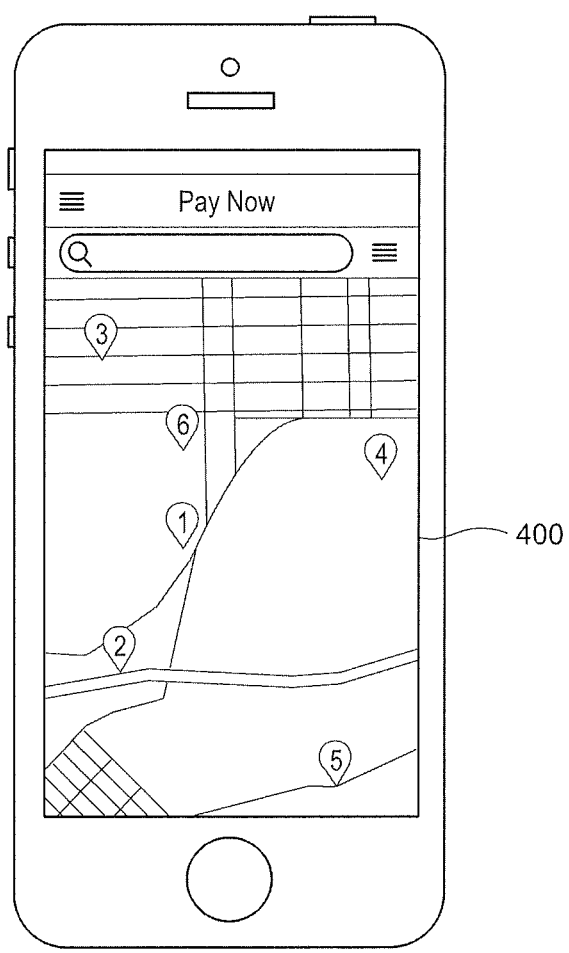
Figure 9B:
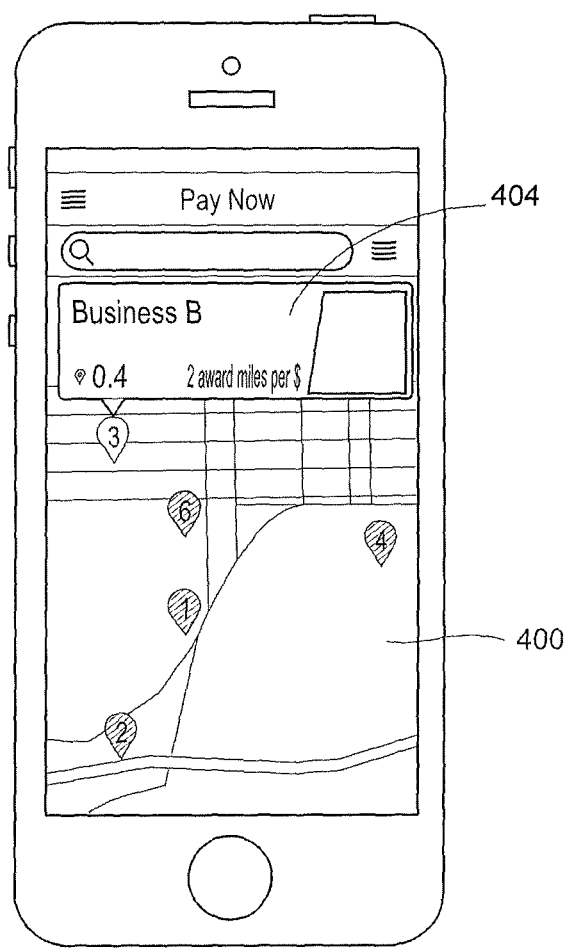

FIGS. 9A and 9B illustrates a map screen 400 that may be displayed on the mobile device 212 if a "Map Search" button 402 is selected from screen 350. The map screen 400 depicts a map and the locations of the stores identified in the search listing of screen 354. In FIG. 9B, the map screen 400 shows a store detail window 404 that pops up when the user selects one of the identified stores.

Figure 10:
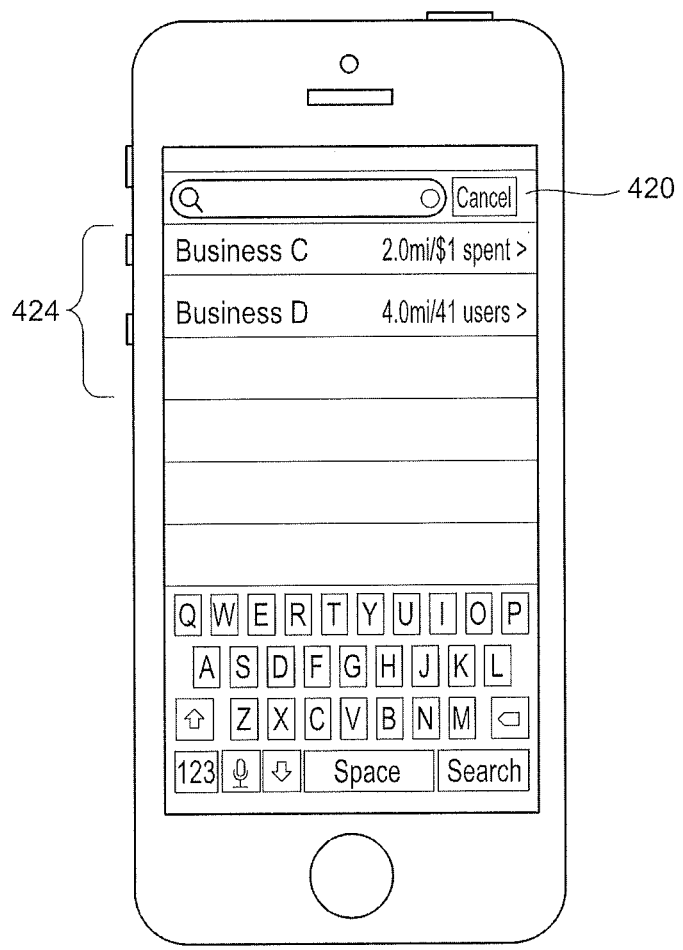

FIG. 10 illustrates a search screen 420 that may be displayed after the user selects a search field 422 in screen 350. The screen 420 depicts a listing of merchant results 424 corresponding to the user search. The search results may be determined by the mobile payment system 140, e.g., though geo-locating the location of the mobile device 212 using the geo-location application 192 determining corresponding participating merchants using the offer manager application 188.

Figure 11:
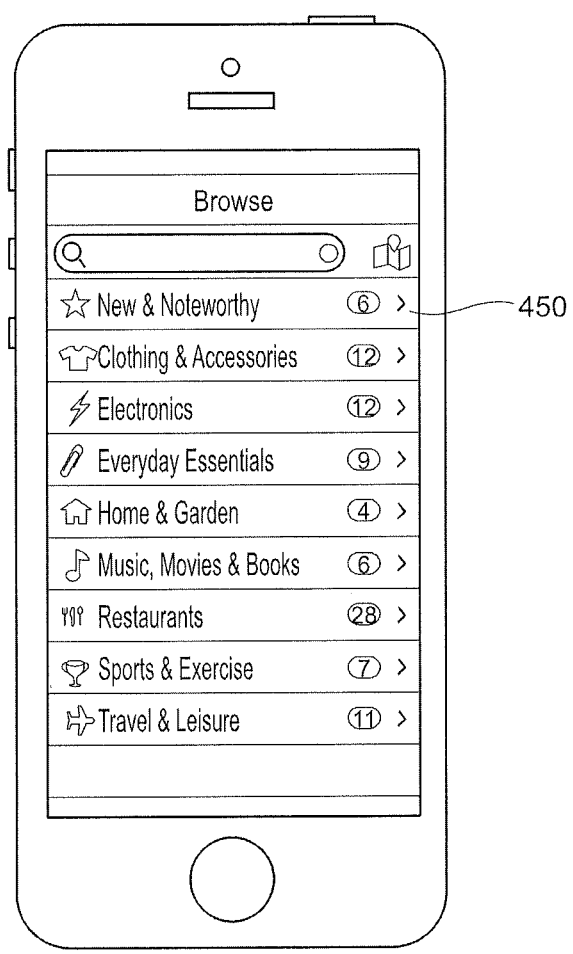

The user can browse through available merchants by selecting a "Browse" button or link 306 in the screen 300 of FIG. 4. An example "Browse" screen 450 is shown in FIG. 11 and provides a listing of merchant categories, where each row may contain an identifying icon, the category name, and a total number of merchants corresponding to that category. Selecting one of the categories may take the user to the "Pay Now" screen 340.

Figure 12A:
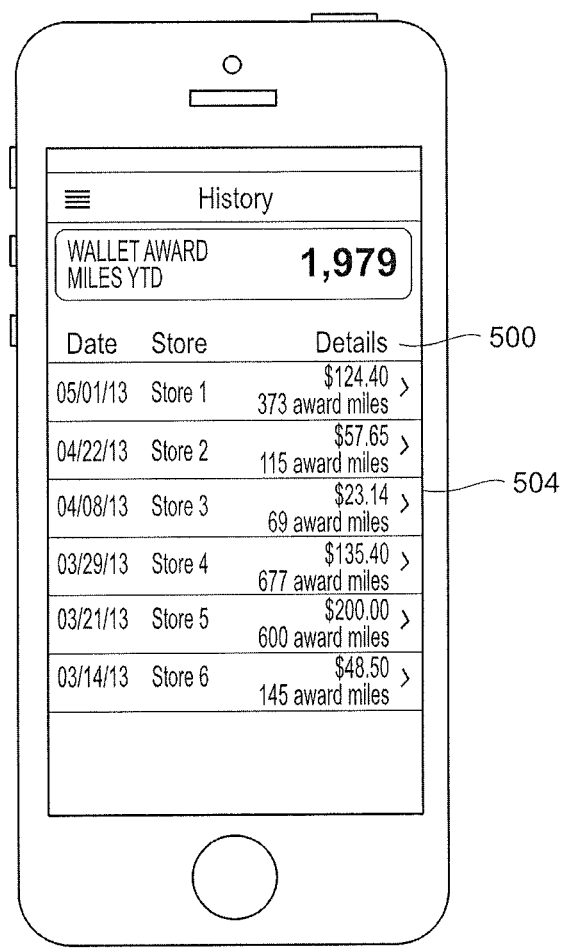
Figure 12B:
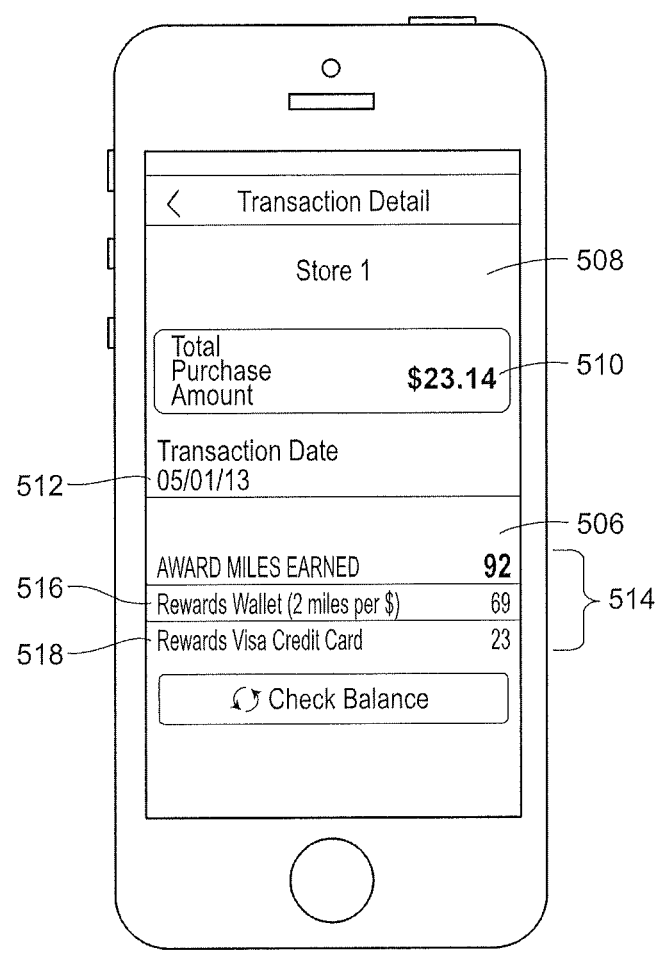

FIG. 12A illustrates a "History" screen 500 that may be displayed after a "History" button or link 308 in the screen 300 is selected by the user. The screen 500 depicts the transaction history of the user, e.g., in scrolling display window 504. Selecting any one of the listed transactions can take the user to a "Transaction" detail screen 506, shown in FIG. 12B. The screen 506 displays at least a portion of the transaction data, including merchant name 508, transaction amount (e.g., purchase price) 510, transaction date 512, and a rewards points listing 514. The listing 514, in the illustrated example, depicts the total amount of rewards points awarded as well as a breakdown of the rewards points. In the illustrated example, the user received a first amount of rewards points 516 for using the mobile payment system and a second amount of rewards points 518, using a different valuation rule, by using a rewards points associating credit card as the method of user payment.

Figure 13:
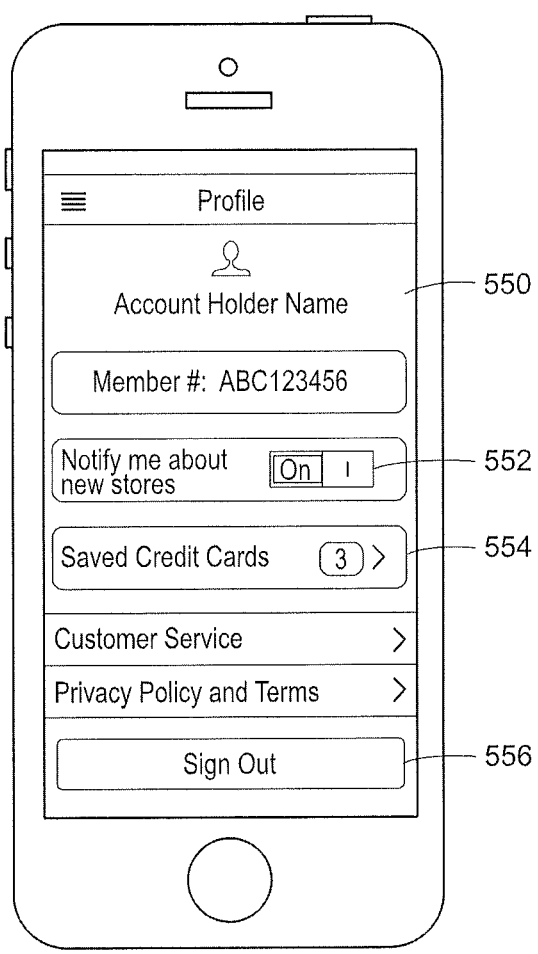

FIG. 13 illustrates a "Profile" Screen 550 that may be displayed after a "Profile" button 310 in the screen 300 is selected by the user. The user name and identification number for the mobile transaction payment system is displayed. From the screen 550, a user may set notifications by a notification toggle button 552, select to view, enter, and delete methods of payment, e.g., credit cards, etc., through selection button 554, and sign out of the mobile transaction payment system through a "Sign Out" button 556.

In some examples, the screens discussed herein may display pop-up messages to users, messages providing events or notifications as determined by the application 186 of FIG. 2. Example messages include, success messages indicating the amount paid for a transaction and/or the amount of rewards points, special offers, error messages indicating a transaction was not completed, etc.

Figure 14B:
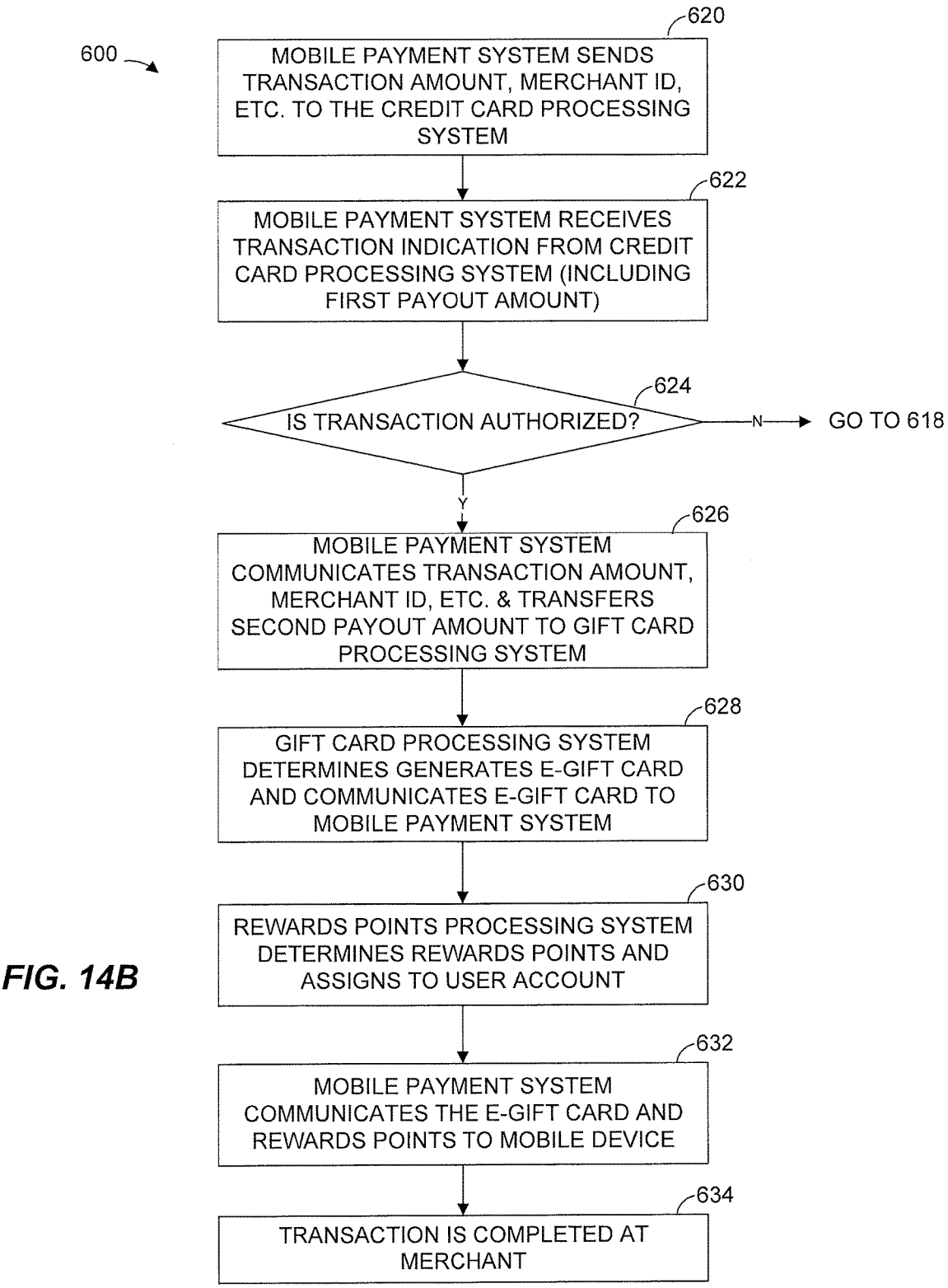

FIGS. 14A and 14B are flow diagrams of an example method 600 for completing a mobile transaction with award of rewards points provided to the user. More particularly, one or more software modules or applications running on the mobile payment system server 140, the gift card processing system 170, the credit card processing system 172, the geo location processing system 173, the device identification system 174, the rewards points processing system 175, and/or the network enabled devices 206-217 may implement the method 800 to allow a user to complete a transaction on their mobile device. First, a user may initiate an application 254A by inputting a command to the device 212 (e.g., by activating a button on the home screen of the device 212) (block 602). The device 212 automatically sends geo-location data to the mobile payment system server 140 (block 604). The mobile payment system 140 may receive the data via the user interface module 176 that performs any data packet stripping and provides that stripped data to the geo-location application 192, which determines the geo-location of the device 212. The geo-location application 192 may then provide the data to an offer manager module 188 that in conjunction with the geo-location application 192 identifies merchants corresponding to the geographic location of the device 212, which listing is communicated back to the mobile device 212 (block 606). The merchants identified by the mobile payment system and communicated to the device 212 may be identified based on geographic location, rewards points, category type, etc. or some combination thereof. The mobile device 212 then displays the listing of identified merchants for selection by the user (block 608), e.g., at the "Pay Now" screen 340. For each listed merchant, the mobile device 212 may also display an initial rewards points indicator, e.g., indicators 360A-360E.

Once the user selects one of the displayed merchants (block 610), the user is able to enter a transaction amount, e.g., at the "Enter Amount" screen 370, which the mobile device 212 transmits, along with other transaction information (e.g., user name, user identification number, selected form of payment, name of the merchant, name of the items for purchase if applicable, location of the device, device IP address, etc.) to the mobile payment system 140 (block 612). The mobile payment system 140 performs an authorization check for the user (block 614), determining if the user is allowed to make the purchase, for example, by checking the user, device attributes, and the transaction data against a fraud database. If the transaction is not authorized (block 616), a rejection notification is displayed to the user (block 618) and the transaction process ends.

If the transaction is authorized by the mobile payment system 140, the system 140 passes transaction data to the credit card processing system 172, including the transaction amount, merchant identification data, a credit card number corresponding to the selected method of payment, and customer identification data (block 620). The credit card processing system 172 may then perform an authorization based on the received transaction data, including a determination of whether use of the credit card is authorized or not. If the transaction is authorized, then the credit card processing system 172 completes payment of the transaction by charging the user's credit card an amount corresponding to the transaction price. Instead of providing those paid funds to the merchant, however, a first payout amount is transferred to the mobile payment system 140 and used to purchase an electronic gift card for completing the transaction at the point of sale. The first payout amount is typically less than the actual transaction amount charged to the user's credit card, as the payment amount reflects a reduction for credit card processing fees and other handling fees.

The mobile payment system 140 receives an indication (block 622) of transaction from the credit card processing system 172. If the transaction has been rejected (as determined at block 624), then a transaction rejection error notification is provided to the mobile device (block 618).

If the transaction is authorized at the credit card processing system 172, then the system 172 transfers an amount of funds to the mobile payment system 140 at the first payout amount. The mobile payment system 140 may then complete the point-of-sale transaction (i.e., between the user and the merchant) by initiating purchase of an electronic gift card from the gift card processing system 170 using the funds transferred (first payout amount) to the mobile payment system 140 by the credit card processing system 172. Specifically, the mobile payment system 140 communicates transaction information, such as the transaction amount, merchant identification data, and in some examples user identification data, etc. to the gift card processing system 170 (block 626). The mobile payment system 140 transfers (block 626) a second payout amount of funds, typically less than the first payout amount, to the gift card processing system 170 for purchase of an electronic gift card in an amount corresponding to the transaction amount. The gift card processing system 170 then generates an electronic gift card (block 628), including serial number for the gift card and a corresponding barcode, QR code, or other coded version of the gift card. The system 170 typically will issue the gift card at an amount that equals the amount of the transaction amount 374 entered by the user at screen 370. In this way, the electronic gift card may be a variable denomination gift card. The system 170 communicates (block 628) the generated electronic gift card to the mobile payment system 140, which then transmits the electronic gift card to the mobile device 212 for display, e.g., as in the screen 390.

Additionally, the mobile payment system 140 provides transaction data to the rewards points processing system 175, which determines an amount of rewards points corresponding to the transaction and which assigns those determined rewards points to the rewards points account associated with the user (block 630). The mobile payment system 140 communicates the amount of rewards points awarded and the electronic gift card to the mobile device 212 (block 632). The rewards points determination may be performed at any stage in the flow diagrams of FIGS. 14A and 14B, after the transaction has been accepted by the user. The examples herein are not limited to the illustrated ordering of operations in the flow diagrams.

The transaction is completed by the merchant (or user) scanning the barcode presented on the screen 370, or by entering the barcode serial number (block 634). After completion of the transaction, the mobile device 212 communicates an indication of the completed transaction to the mobile payment system 140, which stores data on the transaction for future reference. A user, as discussed above, may view the stored transaction data.

FIG. 15 is a block diagram 700, with data flows, showing another example technique for performing a point-of-sale transaction using an alternative form of payment from that selected by a user. A mobile device 702, like the mobile devices 206-217, identifies transaction data, including a purchase amount corresponding to the transaction. For example, the mobile device 702 may identify transaction data from a merchant 704, either through manual entry of a purchase amount, through scanning barcodes, RFIDS, NFC data, etc., or some other method. Conventionally, this transaction data would be communicated, through a digital network 706, to a (primary) payment processing system 708, as shown by communication path 709, where that payment system 708 would be a credit card payment system or other payment system selected by the user of the mobile device 702. The examples herein detail the first payment system as a credit card system, but the first payment system may be any type of payment system, whether a credit card system, a virtual cash system, a gift card system, a rewards points system, or some other transaction system that can complete a transaction. In any event, in a conventional system, the payment system 708 would complete the transaction by transferring a first payout amount directly to the merchant 704, i.e., to an account associated with the merchant, where that first payout amount is at a payout percentage of the transaction amount, representing a fee charge associated with the payment system 708. That conventional payout may be directly to the merchant 704, from the payment processing system 708 through the link 709, which may be partially through another network, other than network 706, or through network 706.

In the system 700, however, the payment system 708 is initially bypassed by a mobile payment system 710 that manages transaction-related interactions between the mobile device 702 and the payment system 708. That is, instead of serving as the primary and exclusive payment system, the payment system 708 becomes the intermediate payment system 708 in the configuration 700. More specifically, in the illustrated example, the mobile device 702 transmits transaction data (on data path 711) directly to the mobile payment system 710, which manages authorization and payment with the payment system 708 (via data path 713). The mobile payment system 710 becomes the payee of the payment system 708, in place of the merchant, blocking the payment system 708 from completing the transaction itself. Instead, the mobile payment system 710 receives the first payout amount from the payment system 708 (via data path 715). The mobile payment system 710 then uses a portion of that amount, i.e., at a second payout amount discounted from the first payout amount, to complete the transaction with the merchant 704 by finding a secondary payment system 712 to resolve the transaction at or below the second payout amount. The mobile payment system 710 transfers the second payout amount to the secondary payment system 712 (on data path 717), which identifies the corresponding merchant, issues payment for the merchant, and transfers that payment to the merchant, either on data path 719 or through communicating the payment to the mobile payment system 710 on a data path 721.

In examples described herein, the secondary payment system 712 may be any type of payment system, including a second credit card system, a virtual cash system, a gift card system, a rewards points system, etc. Furthermore, the system 700 may include a plurality of secondary payment systems, which would allow the mobile payment system 710 to select from among the plurality of secondary payment systems the one that provides the greatest discounted payout to complete the transaction.

As a payment system bypass system, the mobile payment system 710 incentivizes users to use the system 700 by offering rewards points for the purchase. The amount of rewards points may be determined by the mobile payment system 710, and in particular by a rewards points module 720 within the system 710, and based on information on the merchant 704, on the user of the mobile device 702, and/or on other transaction related factors. As shown in the illustrated example, available and awarded rewards points are communicated from the mobile payment system 710 to the mobile device 702 (e.g., on the data line 711) to provide incentives to use the system 700. While the incentives described hereinabove are rewards points, it would be understood that, in other implementations, the awarding of "rewards points" may be replaced with the awarding of other incentives, such as, by way of example, electronic or real gifts, virtual cash, special customer deals, special merchant deals, debit cards, deposits in an online money transfer service (e.g., PayPal®), coupons, cash rebates, cash back, discounts, wire transfers, tickets, automated clear house money traverses, and other gift cards, where any of these may be electronically distributed or physically distributed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A method of processing a point of sale (POS) transaction between a merchant and a consumer using a mobile device, the method comprising:
   receiving, at a mobile payment transaction system, transaction information pertaining to the POS transaction, wherein the transaction information includes a transaction amount and wherein the transaction information is transmitted by the mobile device over a mobile device communication network, the mobile payment transaction system having at least one processor;

in response to receiving the transaction information, authorizing a transaction between the mobile payment transaction system and an intermediate payment processing system corresponding to a first payout amount that is less than the transaction amount, wherein the intermediate payment processing system utilizes a first form of electronic payment;

in response to authorizing the transaction, purchasing, at the mobile payment transaction system and from a secondary payment processing system, a second form of electronic payment different from the first form of electronic payment using a second payout amount, the second form of electronic payment being valued at the transaction amount using a valuation rule, and wherein the second payout amount is less than the first payout amount;

generating, at the mobile payment transaction system, an amount of rewards points to be awarded to the consumer as a result of completion of the POS transaction, wherein the amount of the rewards points is determined based on information associated with the merchant and/or the consumer using a rewards points valuation rule;

communicating, from the mobile payment transaction system for receipt at the mobile device, the second form of electronic payment for completion of the POS transaction; and in response to receiving, from the mobile device, confirmation of completion of the POS transaction, communicating, from the mobile payment transaction system for receipt at a rewards account associated with the consumer, the amount of rewards points to be awarded to the consumer in response to completion of the transaction.

2. The method of claim 1, wherein the mobile device identifies the transaction information by scanning an identification code or receiving a numeric string associated with the transaction amount.

3. The method of claim 1, wherein the transaction information further comprises consumer identifier data and merchant identifier data.

4. The method of claim 1, wherein generating the second form of electronic payment comprises:
receiving the transaction information from the intermediate payment processing system;
communicating the transaction information to the secondary processing system; and
generating, at the secondary payment processing system, the second form of electronic payment.

5. The method of claim 4, wherein communicating the second form of electronic payment for completion of the transaction comprises:
communicating the second form of electronic payment to the mobile device via the intermediate payment processing system.

6. The method of claim 4, wherein communicating the second form of electronic payment for completion of the transaction comprises:
communicating the second form of electronic payment to the mobile device via the secondary payment processing system.

7. The method of claim 1, wherein:
the second form of electronic payment is an electronic gift card, and
communicating the electronic gift card to the mobile device causes the mobile device to present the electronic gift card for scanning by the merchant.

8. The method of claim 1, wherein the rewards points valuation rule is determined, by the mobile payment transaction system, before the consumer accepts the transaction.

9. The method of claim 1, wherein the rewards points valuation rule is determined, by the mobile payment transaction system, from (i) information pertaining to the merchant and not from information pertaining to the consumer or (ii) information pertaining to the consumer and not from information pertaining to the merchant.

10. The method of claim 1, wherein the rewards points valuation rule is determined, by the mobile payment transaction system, from information pertaining to the merchant, the consumer, or a combination thereof.

11. The method of claim 10, wherein the information pertaining to the consumer is selected from the group consisting of consumer transaction history, merchant transaction amount, participation in one or more rewards programs, and combinations thereof; and wherein the information pertaining to the merchant is selected from the group consisting of merchant transaction history, merchant transaction amount, merchant product catalog, seasonal relevance, and combinations thereof.

12. The method of claim 1, wherein the mobile payment transaction system comprises a rewards points processing system, the method further comprising:
generating, at the rewards points processing system, the amount of rewards points to be awarded as a result of the POS transaction.

13. The method of claim 12, further comprising:
communicating the second form of electronic payment to the intermediate payment processing system for subsequent communication of the second form of electronic payment to the mobile device; and
communicating, from the rewards points processing system to the intermediate payment processing system, a record of the rewards points to be awarded as a result of the transaction.

14. The method of claim 12, further comprising:
determining authorization of the POS transaction, at the mobile payment transaction system, where if the transaction is denied, then sending a denial of transaction message from the mobile payment transaction system to the mobile device, otherwise, if the POS transaction is authorized, then continuing with the generation of the second form of electronic payment and the generation of the amount of rewards points.

15. A non-transitory computer-readable storage medium having stored thereon a set of instructions, executable by a processor, for processing a point of sale (POS) transaction between a merchant and a consumer using a mobile device, the instructions comprising:
instructions for receiving, at a mobile payment transaction system, transaction information pertaining to the POS transaction, the transaction information including a transaction amount and wherein the transaction information is transmitted by the mobile device over a mobile device communication network, the mobile payment transaction system having at least one processor;
instructions for, in response to receiving the transaction information, authorizing a transaction between the mobile payment transaction system and an intermediate payment processing system corresponding to a first payout amount that is less than the transaction amount, wherein the intermediate payment processing system utilizes a first form of electronic payment;

instructions for purchasing, at the mobile payment transaction system, from a secondary payment processing system, and in response to authorizing the transaction, a second form of electronic payment different from the first form of electronic payment using a second payout amount, the second form of electronic payment being valued at the transaction amount using a valuation rule, and wherein the second payout amount is less than the first payout amount;

instructions for generating, at the mobile payment transaction system, an amount of rewards points to be awarded to the consumer as a result of completion of the POS transaction, wherein the amount of the rewards points is determined based on information associated with the merchant and/or the consumer using a rewards points valuation rule;

instructions for communicating, from the mobile payment transaction system for receipt at the mobile device, the second form of electronic payment for completion of the POS transaction; and instructions for, in response to receiving, from the mobile device, confirmation of completion of the POS transaction, communicating, from the mobile payment transaction system for receipt at a rewards account associated with the consumer, the amount of rewards points to be awarded to the consumer in response to completion of the transaction.

16. The computer-readable storage medium of claim 15, having stored thereon a set of further instructions comprising instructions for identifying, at the mobile device, information for completing the POS transaction by scanning an identification code or keying in a numeric string created for the transaction amount.

17. The computer-readable storage medium of claim 16, wherein the information for completing the transaction further comprises consumer identifier data and merchant identifier data.

18. The computer-readable storage medium of claim 15, wherein the instructions for purchasing the second form of electronic payment comprises:
    instructions for receiving the transaction information at a mobile payment system;
    instructions for communicating the transaction information from the mobile payment system to the secondary payment processing system; and
    instructions for generating, at the secondary payment processing system, the second form of electronic payment.

19. The computer-readable storage medium of claim 15, wherein the instructions for communicating the second form of electronic payment for completion of the transaction comprises:
    instructions for communicating the second form of electronic payment from the secondary payment processing system to a mobile payment system; and
    instructions for communicating, from the mobile payment system to the mobile device, the second form of electronic payment.

20. The computer-readable storage medium of claim 15, wherein the second form of electronic payment is an electronic gift card, and wherein the instructions stored thereon include a set of further instructions comprising instructions for presenting the electronic gift card at the mobile device for scanning of the electronic gift card at the mobile device to confirm distribution of the gift card amount to the merchant.

21. The computer-readable storage medium of claim 15, having stored thereon a set of further instructions comprising instructions for determining the rewards points valuation rule from (i) information pertaining to the merchant and not from information pertaining to the consumer or (ii) information pertaining to the consumer and not from information pertaining to the merchant.

22. The computer-readable storage medium of claim 15, having stored thereon a set of further instructions comprising instructions for determining the rewards points valuation rule from information pertaining to the merchant, the consumer, or a combination thereof.

23. The computer-readable storage medium of claim 15, having stored thereon a set of further instructions comprising:
    instructions for generating the second form of electronic payment at the secondary payment processing system; and
    instructions for generating the amount of rewards points to be awarded as a result of the transaction at a rewards points processing system.

24. The computer-readable storage medium of claim 15, having stored thereon a set of further instructions comprising:
    instructions for communicating, from the secondary payment processing system to the mobile payment system, the second form of electronic payment for subsequent communication of the second form of electronic payment to the mobile device; and
    instructions for communicating, from a rewards points processing system to the mobile payment system, a record of the rewards points awarded as a result of the transaction.

25. The computer-readable storage medium of claim 15, having stored thereon a set of further instructions comprising:
    instructions for determining authorization of the transaction, at the mobile payment transaction system, where if the transaction is denied, then sending a denial of transaction message from the mobile payment transaction system to the mobile device, otherwise, if the transaction is authorized, then continuing with the generation of the second form of electronic payment and the generation of the rewards points amount.

26. A system for processing a point of sale (POS) transaction between a merchant and a consumer using a mobile device, the system comprising:
    a mobile payment transaction system comprising a processor and a memory;
    wherein the mobile payment transaction system is configured,
    to receive transaction information pertaining to the POS transaction, the transaction information including a transaction amount and transmitted by the mobile device over a mobile device communication network;
    in response to receiving the transaction information, to authorize a transaction between the mobile payment transaction system and an intermediate payment processing system corresponding to a first payout amount that is less than the transaction amount, wherein the intermediate payment processing system utilizes a first form of electronic payment;
    in response to authorizing the transaction, to purchase a second form of electronic payment from a secondary payment processing system using a second payout amount, the second form of electronic payment being valued at the transaction amount using a valuation rule, and wherein the second payout amount is less than the first payout amount;

to generate an amount of rewards points to be awarded to the consumer as a result of completion of the POS transaction, wherein the amount of the rewards points is determined based on information associated with the merchant and/or the consumer using a rewards points valuation rule;

to communicate, from the mobile payment transaction system for receipt at the mobile device, the second form of electronic payment for completion of the POS transaction; and in response to receiving, from the mobile device, confirmation of completion of the POS transaction, to communicate, from the mobile payment transaction system for receipt at a rewards account associated with the consumer, the amount of rewards points to be awarded to the consumer in response to completion of the transaction.

* * * * *